(12) United States Patent
Wakabayashi

(10) Patent No.: US 8,064,750 B2
(45) Date of Patent: Nov. 22, 2011

(54) PICTURE REPRODUCING APPARATUS

(75) Inventor: Noboru Wakabayashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1038 days.

(21) Appl. No.: 11/202,147

(22) Filed: Aug. 12, 2005

(65) Prior Publication Data

US 2006/0078313 A1    Apr. 13, 2006

(30) Foreign Application Priority Data

Oct. 12, 2004    (JP) .................................. 2004-297121

(51) Int. Cl.
H04N 5/93       (2006.01)
H04N 9/80       (2006.01)
G11B 27/00      (2006.01)
H04N 5/92       (2006.01)

(52) U.S. Cl. ........ 386/278; 386/239; 386/248; 386/280; 386/281; 286/326

(58) Field of Classification Search ............ 386/23–126, 386/239, 248, 278, 280, 281, 326; 348/700–701
See application file for complete search history.

(56) References Cited

U.S. PATENT DOCUMENTS

| | | | | |
|---|---|---|---|---|
| 5,949,953 A * | 9/1999 | Shirakawa et al. | ............. | 386/70 |
| 5,974,219 A * | 10/1999 | Fujita et al. | ...................... | 386/52 |
| 7,305,171 B2 * | 12/2007 | Kim et al. | ........................ | 386/68 |
| 7,403,695 B2 * | 7/2008 | Kikuchi et al. | ................. | 386/95 |
| 2004/0131331 A1 | 7/2004 | Kim et al. | | |

FOREIGN PATENT DOCUMENTS

| | | |
|---|---|---|
| CN | 1497973 | 5/2004 |
| JP | 06-111545 | 4/1994 |
| JP | 08-83480 | 3/1996 |
| JP | 08-163497 | 6/1996 |
| JP | 8-331504 | 12/1996 |
| JP | 9-27189 | 1/1997 |
| JP | 9-107517 | 4/1997 |
| JP | 10-224779 | 8/1998 |
| JP | 10-290423 | 10/1998 |
| JP | 2001-309294 | 11/2001 |

OTHER PUBLICATIONS

Office Action issued in Chinese Patent Application No. 200510090846X on Jun. 27, 2008.
Office Action in JP 2008-212371, dispatched Apr. 12, 2011, (in Japanese, 3 pgs.).

* cited by examiner

*Primary Examiner* — Thai Tran
*Assistant Examiner* — Daquan Zhao
(74) *Attorney, Agent, or Firm* — Antonelli, Terry, Stout & Kraus, LLP.

(57) ABSTRACT

In a picture reproducing apparatus, a scene changing point is detected with respect to contents, and then, a position where a temporal stopping operation is performed and a position where a reproducing operation is restarted are determined by using information of the detected changing point. In detecting the scene changing point, a plurality of threshold values are set to set a changing point level at the scene changing point. When the user instructs temporal stopping of reproduction of contents, the temporal stopping position is displayed to the user using the scene changing point level to allow the user to determine a temporal stopping position in a desirable level. When the user instructs restarting of the reproducing operation of the contents temporarily stopped, a reproduction restarting position is displayed by similarly using a scene changing point level to allow the user to determine a reproduction restarting position in a desirable level.

20 Claims, 13 Drawing Sheets

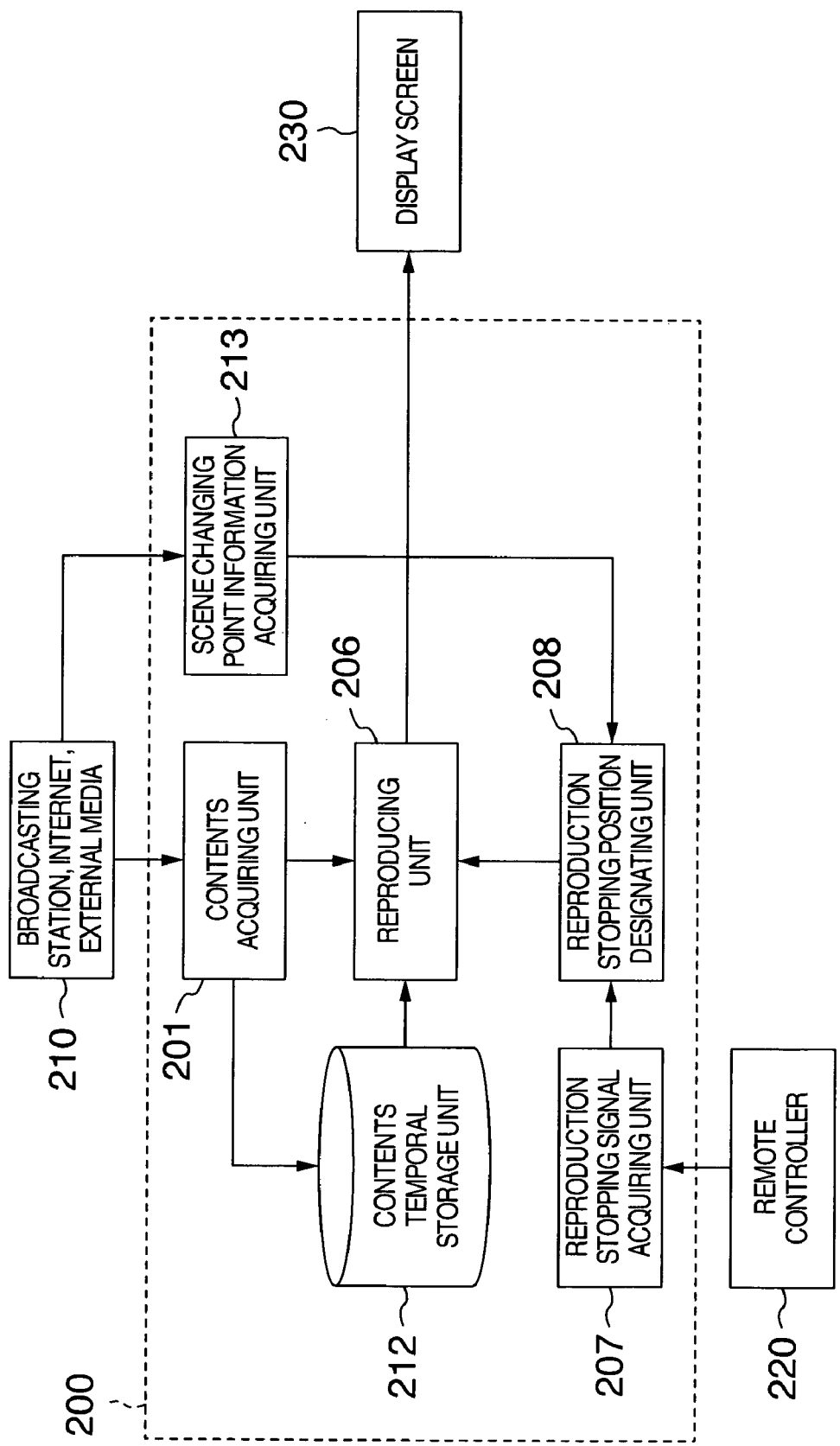

PICTURE REPRODUCING APPARATUS

INCORPORATION BY REFERENCE

The present application claims priority from Japanese application JP2004-297121 filed on Oct. 12, 2004, the content of which is hereby incorporated by reference into this application.

BACKGROUND OF THE INVENTION

The present invention generally relates to a picture processing technique capable of reproducing, stopping, and the like a moving picture. More specifically, the present invention is directed to such a picture recording/reproducing technique capable of stopping and reproducing moving pictures by employing scene changing points of these moving pictures.

While a user views a picture content such as a television program, when the user leaves halfway through the picture content for a moment, the user temporarily stops the reproducing operation of this picture content at such a timing which is judged by the user himself. Thereafter, when the reproducing operation is restarted, the user restarts the reproducing operation from the position where the user temporarily stopped the previous reproducing operation. In connection thereto, in such a case that the user temporarily has stopped a reproducing operation while a player of a content such as a movie and a drama is speaking her part, the user must manually return the content to a preceding scene as to the stopped scene and must restart to reproduce the content from this preceding scene in order to understand the contents of the player's part. Accordingly, the user must perform such a cumbersome operation.

To solve the above-explained problem, JP-A-2001-309294 discloses such a technical idea that a reproducing operation is returned to a head portion of the relevant scene by using a subtitle of a player's part so as to be restarted.

In the example disclosed in JP-A-2001-309294, when a user leaves halfway through a picture content, if the user instructs a temporal stopping operation, then a reproducing operation is temporarily stopped. Also, in such a case that the user restarts a reproducing operation, if the user instructs the reproducing operation, then a reproduction restarting position determining means determines a restarting position by checking as to whether or not a sub-picture signal containing a subtitle and the like. In the case that the subtitle is contained in the sub-picture signal when the reproducing operation is temporarily stopped, since a player speaks her parts, the reproduction restarting position determining means determines a reproduction restarting position at a head position of such a scene where the subtitle is present. On the other hand, in the case that the subtitle is not contained in the sub-picture signal when the reproducing operation is temporarily stopped, the reproduction restarting position determining means determines a reproduction restarting position at a position where the reproducing operation has been temporarily stopped. Alternatively, in such a case that a timer counts up a time duration during which a reproducing operation is temporarily stopped and then a first predetermined time has elapsed, the reproduction restarting position determining means determines a reproduction restarting position at a position where the reproducing operation is returned by a second predetermined time. As a consequence, in the case that the reproducing operation is temporarily stopped at the scene where the player's part of the subtitle is present, the reproducing operation can be restarted from the head position. Also, even in such a case that the subtitle is not present and the user leaves halfway through the picture content for a relatively long time, the user can readily understand the details of this picture content.

Furthermore, JP-A-9-107517 discloses a method capable of detecting a changing point of a moving picture. In this patent publication, such a reproduction stopping technique is described. That is, for instance, when a user pushes a stop button while a moving picture is reproduced, a judgment is made that a frame is designated by the user, and then, a changing portion (changing point) of cut scenes of the moving picture located in the vicinity of this designated frame is detected, so that the reproducing operation is stopped at this changing point.

SUMMARY OF THE INVENTION

When a user leaves halfway through a picture content in such a not-urgent case as a break, the user may conceive that the user wants to temporarily stop a reproducing operation at a more preferable position of a scene. However, in such a conventional technique that the user temporarily stops the reproducing operation at such a timing which is judged by this user himself, since the user cannot grasp the more preferable scene position such as the scene changing point, there are problems that the user may fail to catch this timing, and the user may not grasp such a situation that this user should wait for this good timing.

To the contrary, in the conventional idea proposed in JP-A-2001-309294, in the case that the subtitle is not contained in the picture content, the reproducing operation is restarted from either the position where the reproducing operation has been temporarily stopped or the position where the reproducing operation has been returned for a predetermined time. Thus, the user can hardly and readily grasp the details of this picture content. As a consequence, this proposed idea cannot sufficiently achieve the user-friendly characteristic.

On the other hand, in the example proposed in JP-A-9-107517, the reproducing operation of the moving picture is stopped at the scene changing point. However, since this proposed conventional technique has the purpose to edit the moving picture, the user-friendly characteristic can be hardly achieved in such a case that a reproducing operation of a content while being viewed is temporarily stopped, and the reproducing operation is restarted.

The present invention has been made to solve the above-explained problems, and therefore, has an object to provide a picture reproducing apparatus capable of improving user-friendly characteristics as to stopping operations and reproducing operations of picture contents.

To solve the above-explained problems, a picture reproducing apparatus for reproducing a picture content is provided with a scene changing point judging means for judging a scene changing point of the picture content, and a reproduction control means for controlling a reproducing operation and a temporal stopping operation. The picture reproducing apparatus performs the temporal stopping operation, or restarts the reproducing operation by employing information related to the scene changing point which is judged by the scene changing point judging means.

Also, the picture reproducing apparatus is provided with a changing point level setting means for setting a level of a scene changing point of a content. While such an information as to the changing point level set by the changing point level setting means is added to the above-described scene changing point information, the picture reproducing apparatus changes a position where a temporal stopping operation is carried out, or a reproducing operation is restarted based upon the added changing point level.

In accordance with the present invention, the picture reproducing apparatus is capable of improving the user-friendly characteristics as to the stopping operations and the reproducing operations of pictures.

BRIEF DESCRIPTION OF THE DRAWINGS

These and other features, objects and advantages of the present invention will become more apparent from the following description when taken in conjunction with the accompanying drawings wherein:

FIG. 13 is a block diagram for representing an arrangement of the picture reproducing apparatus when a reproduction restarting function is used, according to the fifth embodiment of the present invention.

DETAILED DESCRIPTION OF THE EMBODIMENTS

Referring now to drawings, various embodiments of the present invention will be described.

A description is made of a picture reproducing apparatus according to a first embodiment of the present invention with reference to FIG. 1 to FIG. 5.

In the picture reproducing apparatus of this first embodiment, a temporary stopping operation and a reproduction restarting operation are carried out at a scene changing point of contents. It should be understood that a scene changing point implies a changing point of contents as to respective scenes. For example, this scene changing point corresponds to a changing point where scenes are shifted in a drama program, or corresponds to a changing point where speakers are changed in a drama program. Also, this scene changing point corresponds to such a changing point when music is played and music is not played in a music program. In order to detect this scene changing point, the following detecting method may be employed. That is, feature amounts of images and voice are calculated every time a frame is inputted, and further, relative coefficients of the feature amounts among the frames are calculated, and then, such a changing point whose correlative coefficient exceeds a predetermined level is detected. In order to detect a changing point of scenes, a difference (namely, brightness, color histogram, etc.) in proceeding/succeeding frames of a moving picture, various sorts of feature amounts (namely, motion vector amounts (motion compensation) etc.) which are calculated when a moving picture is coded/decoded, an audio change (switching between "monaural" and "stereophonic", sound volume change, detection of no sound etc.), and the like may be employed. For instance, if a difference in preceding/succeeding frames of a moving picture is employed so as to detect the scene changing point, then such scene changing points may be detected with respect to an analog moving picture and a non-compressed moving picture. Also, if various sorts of featured amounts which are calculated when a moving picture is coded/decoded are used so as to detect a scene changing point, since the feature amounts which are used to detect the scene changing point have already been calculated before the scene changing point is detected, a load given when the scene changing point is detected may be reduced. Furthermore, if an audio change is used so as to detect a scene changing point, then there is a certain merit that precision of detecting the scene changing point is increased, depending upon contents such as music programs.

Figure 1:
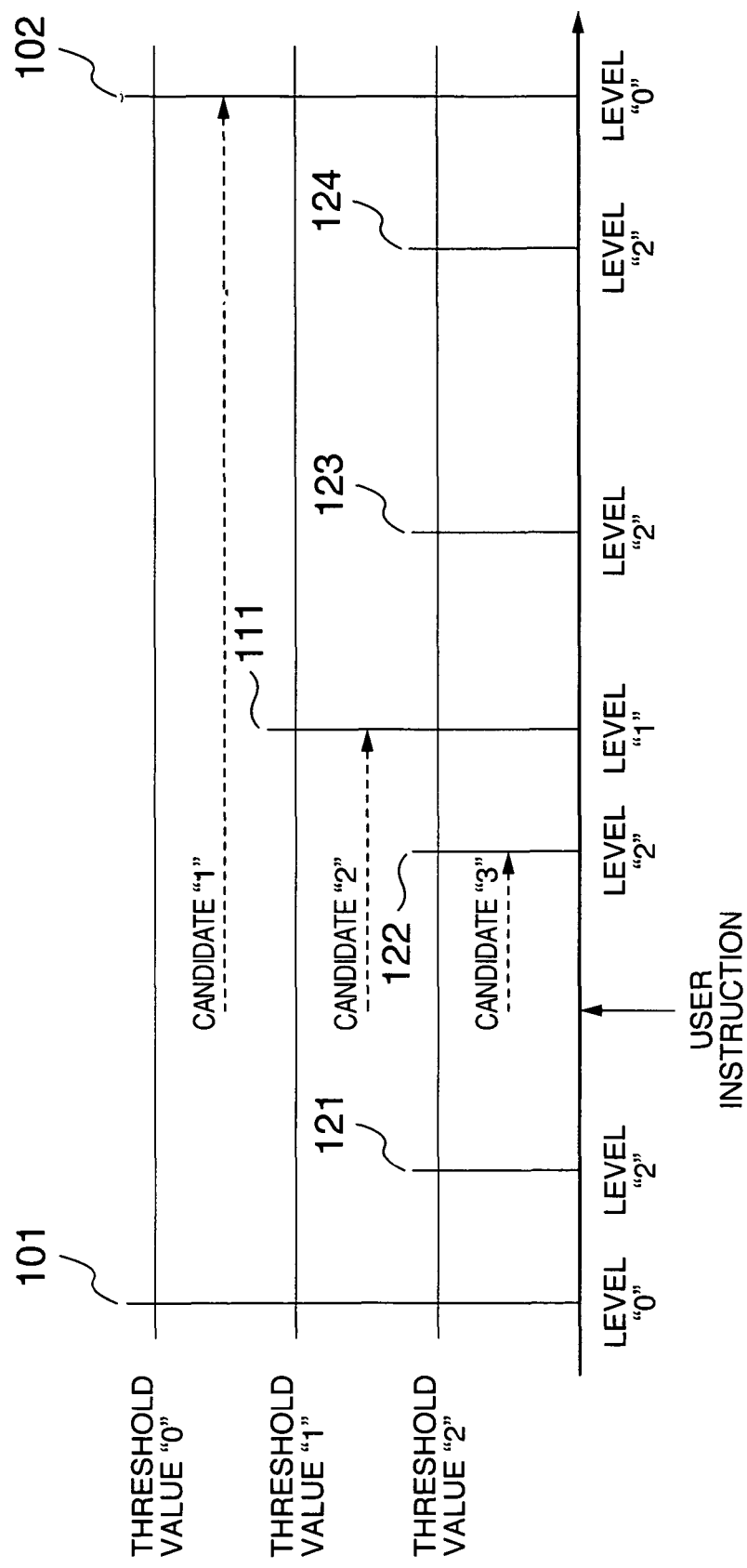
FIG. 1 is a schematic diagram for illustratively showing a temporal stopping function realized in the present invention.
Figure 2:
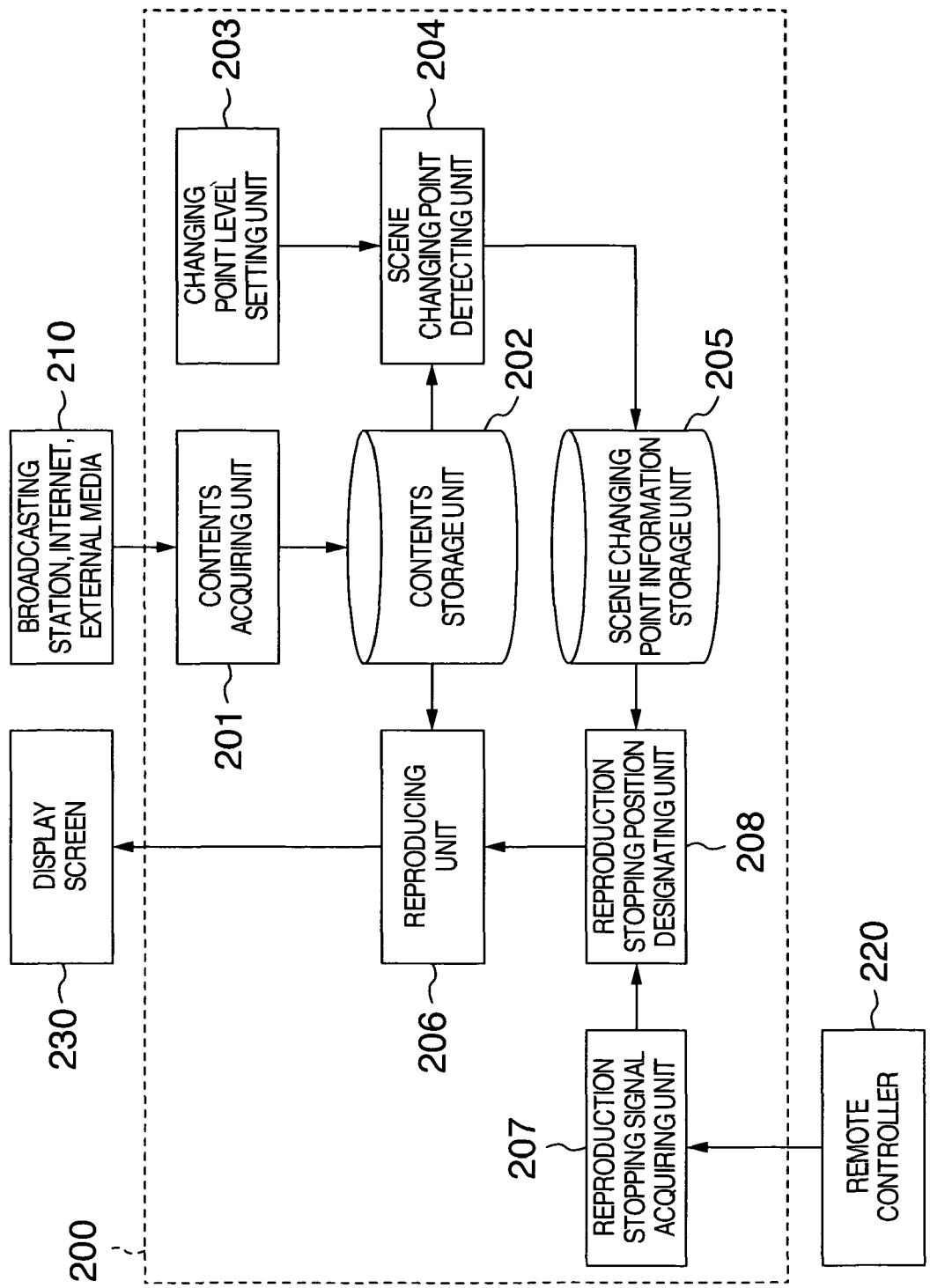
FIG. 2 is a block diagram for indicating an arrangement of a picture reproducing apparatus according to a first embodiment of the present invention.
Figure 3:
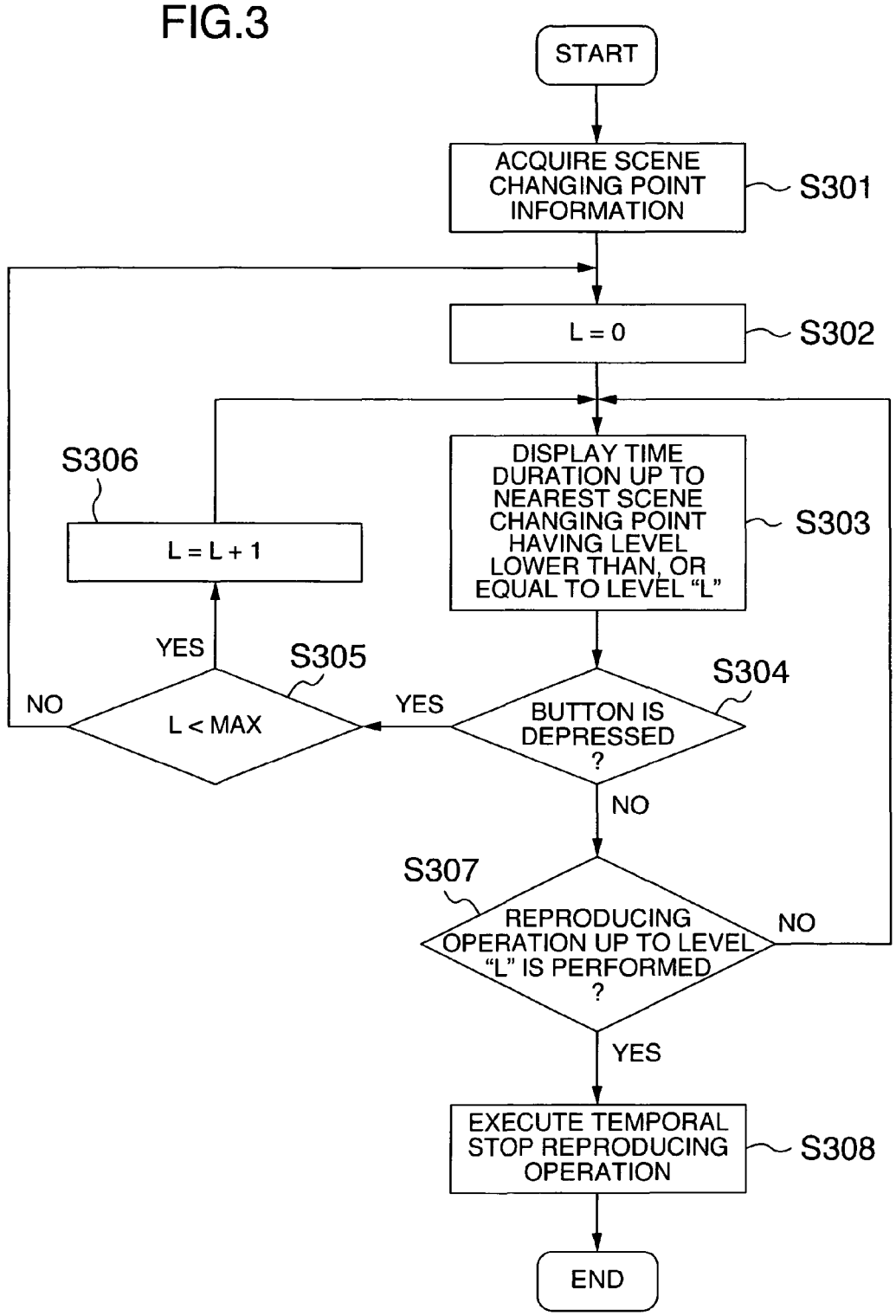
FIG. 3 is a flow chart for describing sequential processing operations of a temporal stopping function in the picture reproducing apparatus according to the first embodiment of the present invention.
Figure 4:
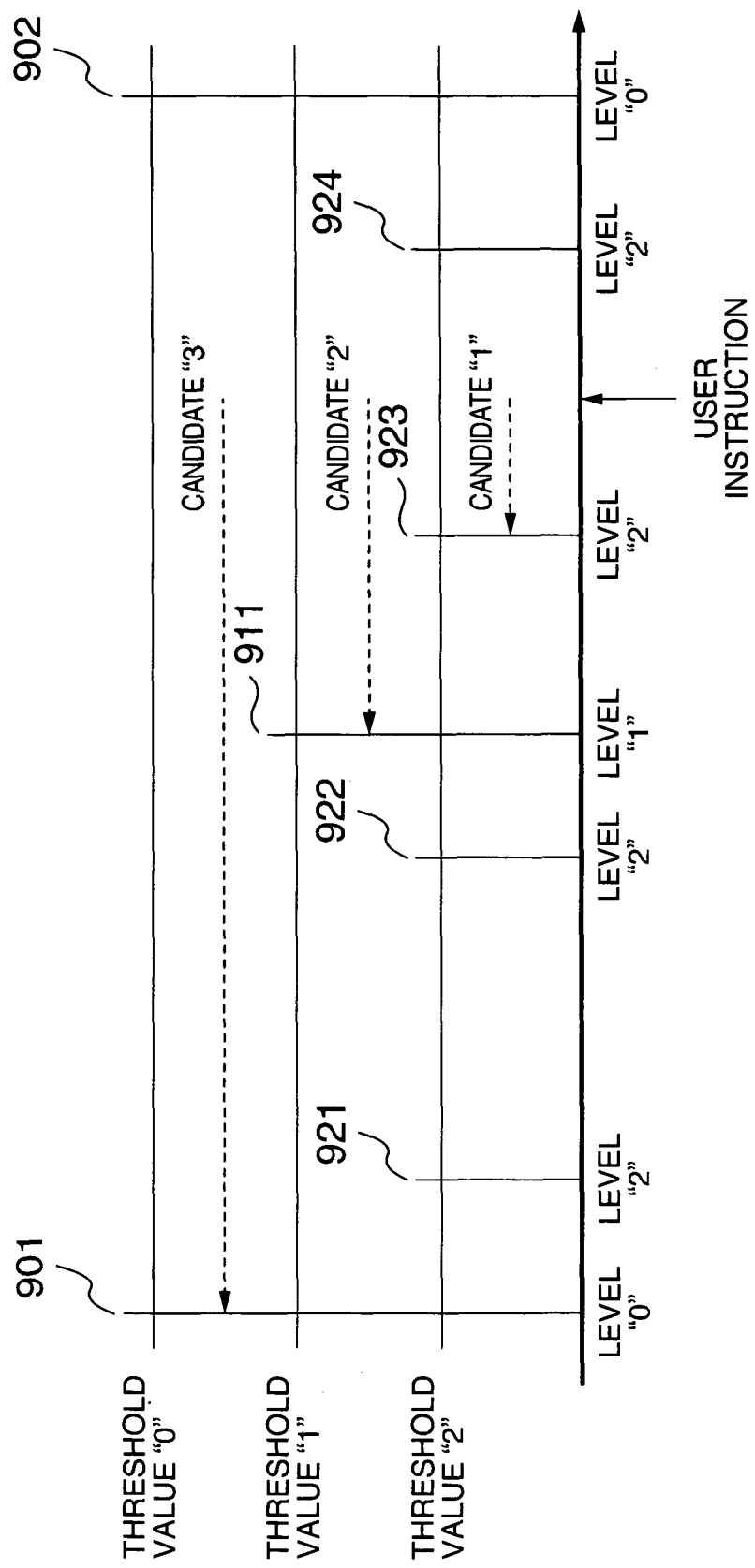
FIG. 4 is a schematic diagram for illustratively indicating a reproduction restarting function realized in the present invention.
Figure 5:
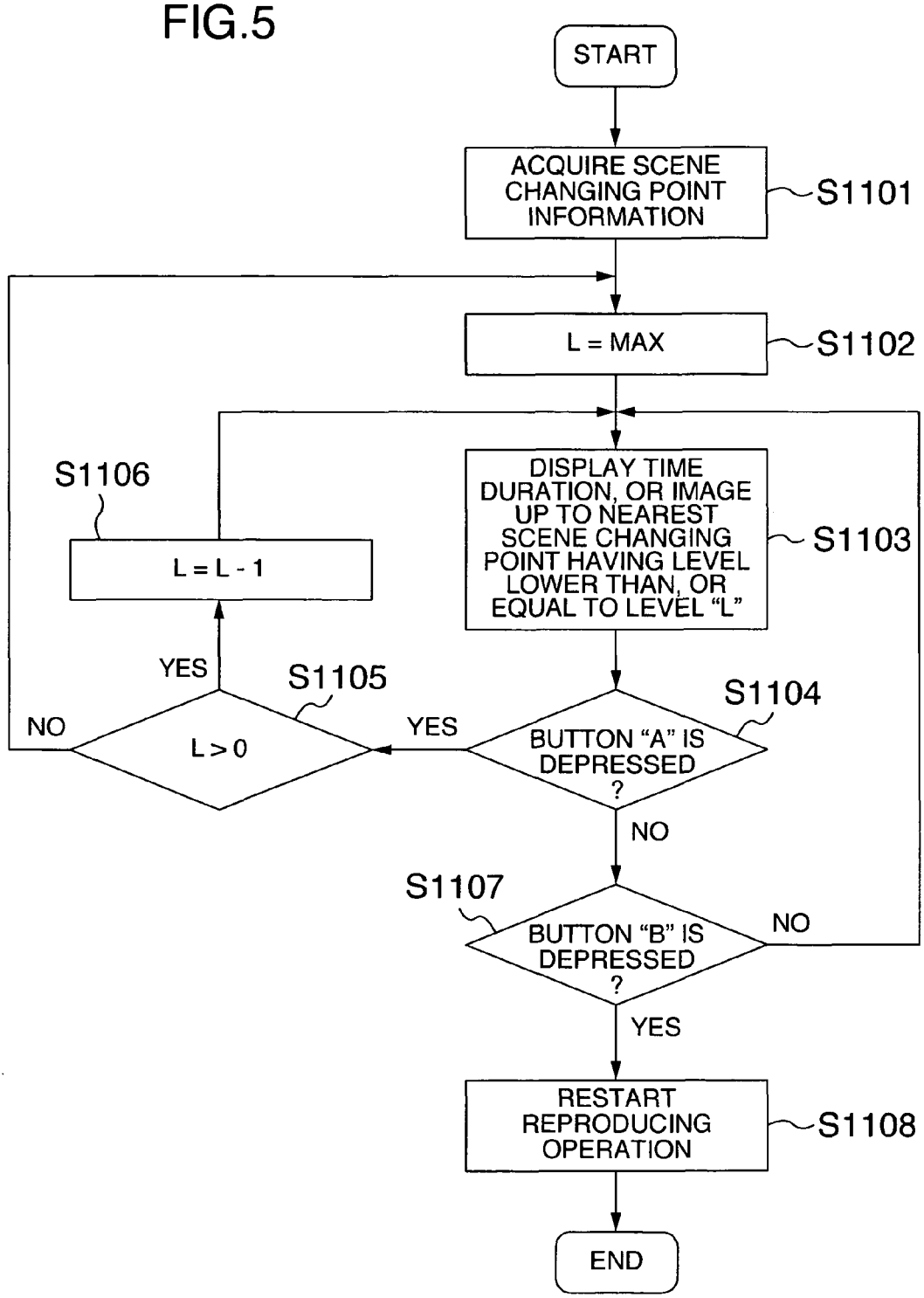
FIG. 5 is a flow chart for explaining sequential processing operations of a reproduction restarting function in the picture reproducing apparatus according to the first embodiment of the present invention.

FIG. 1 is a diagram for schematically showing a function of a temporal stopping operation (will be referred to as "temporal stopping operation after reproduction" hereinafter) with employment of scene changing points of contents, according to the present invention. FIG. 2 is a schematic block diagram for indicating an arrangement of a picture reproducing apparatus according to the first embodiment of the present invention. FIG. 3 is a flow chart for describing sequential process operations of the picture reproducing apparatus in the case that a temporal stopping operation after reproduction is carried out when contents are reproduced. Further, FIG. 4 is a diagram for schematically showing a function of a reproduction restarting operation with employment of scene changing points of contents, according to the present invention. FIG. 5 is a flow chart for describing sequential process operations of the picture reproducing apparatus in the case that a reproducing operation is restarted when the reproducing operation of the contents is temporarily stopped.

FIG. 1 is a diagram for schematically indicating the function as to the temporal stopping operation after reproduction according to the present invention. In this drawing, an abscissa shows time, and an ordinate represents detection values of the scene changing points. As to the contents, changing points of scenes are automatically detected by a scene changing point detecting unit for judging changing points of scenes. In this case, since a plurality of threshold values are set, levels may be given to scene changing points. That is, when a detection value of a scene changing point exceeds a threshold value "0" of a level "0", it is assumed that this scene changing point is set as a level "0." Also, when a detection value of a scene changing point exceeds a threshold value "1" of a level "1" and does not exceed the threshold value "0" of the level "0", it is assumed that this scene changing point is set as a level "1." Further, when a detection value of a scene changing point exceeds a threshold value "2" of a level "2" and does not exceed the threshold value "0" of the level "0", it is assumed that this scene changing point is set as a level "2." Alternatively, both a scene changing point and a level thereof may be given to contents as additional information such as mete data. In FIG. 1, since detection values of scene changing points "101" and "102" exceed the threshold value "0", these scene changing points become the scene changing point of the level "0." Since a detection value of a scene changing point "111" exceeds the threshold value "1" and does not exceed the threshold value "0", this scene changing point constitutes the scene changing point of the level "1." Further, since detection values of scene changing points 121, 122, 123, and 124 exceed the threshold value "2" and do not exceed the threshold value "1", these scene changing point constitute the scene changing point of the level "2." In such a case that a user depresses a temporal stopping button after reproduction which is provided on an input apparatus such as an operation panel of the main apparatus body, or a remote controller between the scene changing point 121 of the level 2 and the scene changing point 122 of the level 2 when the contents are reproduced, the picture reproducing apparatus according to the first embodiment of the present invention is set in such a manner that the reproducing operation is temporarily stopped at the scene changing point 102 of the level "0" which is located at the right-sided nearest position on the time axis, and displays a time duration until the temporal stopping position on a display screen, for instance, "O seconds are left until temporal stopping operation." In the case that the user cannot wait for this temporal stopping position of the scene changing point 102, since the user again depresses the temporal stopping button after reproduction, the picture reproducing apparatus according to the first embodiment of the present invention is set in such a manner that the reproducing operation is temporarily stopped at the scene changing point 111 lower than, or equal to the level 1, which is located at the right-sided nearest position on the time axis, and again displays a time duration until the temporal stopping position on the display screen, for example, "Δ seconds are left until temporal stopping operation." Further, in the case that the user cannot wait for this temporal stopping position of the scene changing point 111, since the user again depresses the temporal stopping button after reproduction, the picture reproducing apparatus according to the first embodiment of the present invention is set in such a manner that the reproducing operation is temporarily stopped at the scene changing point 122 lower than, or equal to the level 2, which is located at the right-sided nearest position on the time axis, and again displays a time duration until the temporal stopping position on the display screen, for example, "☐ seconds are left until temporal stopping operation."AS previously explained, since the user repeatedly depresses the temporal stopping button after reproduction, the temporal stopping position can be changed. As previously described in this first embodiment, the stepwise levels are given to the scene changing points, and the user selects these levels, so that the temporal stopping positions can be determined based upon situations of the user.

It should be understood that in this first embodiment, since the temporal stopping button after reproduction has been repeatedly depressed which is provided on the input apparatus such as the operation panel of the apparatus main body, or the remote controller, the temporal stopping condition has been changed. Alternatively, such a scene changing point level switching button for switching a scene changing point level may be provided on the input apparatus such as the operation panel of the apparatus main body, or the remote controller in addition to the temporal changing button after reproduction. In this alternative case, the user depresses the temporal stopping button after reproduction, and thereafter, depresses the scene changing point level switching button, so that the position where the reproducing operation is temporarily stopped may be switched. Alternatively, a band-shaped meter for indicating a time duration may be employed so as to display the time duration until the temporal stopping operation. As a result of this band-shaped meter, the time duration until the temporal stopping operation may be visually grasped by the user. Also, this first embodiment has exemplified such an example that the higher the level of the scene changing point is increased, the smaller the threshold value is decreased. Apparently, the lower the level of the scene changing point may be decreased, the smaller the threshold value may be decreased.

FIG. 2 is a schematic block diagram for showing an arrangement of a picture reproducing apparatus 200 according to this first embodiment. In this drawing, reference numeral 200 indicates the picture reproducing apparatus; reference numeral 210 shows a contents provider which corresponds to external media such as a broadcasting station, the Internet, or a DVD package medium; and reference numeral 220 shows a remote controller equipped with the temporal stopping button after reproduction; and also, reference numeral 230 represents a display screen which displays thereon a picture, and the like. The picture reproducing apparatus 200 is equipped with a contents acquiring unit 201, a contents storage unit 202, a changing point level setting unit 203, a scene changing point detecting unit 204, a scene changing point information storage unit 205, a reproducing unit 206, a reproduction stopping signal acquiring unit 207, and a reproduction stopping position designating unit 208.

The contents acquiring unit 201 acquires a content from the contents provider 21. The contents storage unit 202 stores thereinto the acquired content. The changing point level setting unit 203 sets a level of a scene changing point. The scene changing point detecting unit 204 detects a scene changing point in accordance with the changing point level setting unit 203 with respect to the contents stored in the contents storage unit 202 so as to acquire information as to this scene changing point. The scene changing point information storage unit 205 stores thereinto the scene changing point information acquired by the scene changing point detecting unit 204. The reproducing unit 206 reproduces the contents stored in the contents storage unit 202. The reproduction stopping signal acquiring unit 207 acquires such signals as a temporal stopping signal and a reproduction restarting signal from the input apparatus such as the operation panel of the apparatus main body and the remote controller 220. When the reproduction stopping signal is acquired by the reproduction stopping signal acquiring unit 207, the reproduction stopping position designating unit 208 designates such a position where a reproducing operation is stopped from the scene changing point information stored in the scene changing point information storage unit 205.

It should be understood that the levels of the scene changing points set by the changing point level setting unit 203 are contained in the scene changing point information acquired by the scene changing point detecting information acquiring unit 205 in addition to the positional information such as times of scene changing points.

Next, operations of the picture reproducing apparatus 200 according to this first embodiment will now be described in detail.

FIG. 3 is a flow chart for explaining sequential process operations of a temporal stopping operation after reproduction executed in the above-explained picture reproducing apparatus 200 in such a case that the user depresses the temporal stopping button after reproduction when contents are reproduced. It should also be noted that as to scene changing point information, scene changing points of contents stored in the contents storage unit 202 have been detected by the scene changing point detecting unit 204, and the detected scene changing points have been previously stored in the scene changing point information storage unit 205. In the case that the user wants to leave halfway through a reproducing operation of contents, the user depresses the temporal stopping button after reproduction which is provided on the input apparatus such as either the operation panel of the picture reproducing apparatus 200 or the remote controller 220. In response to this button depressing operation, the process operations shown in FIG. 3 are carried out. When the stop signal acquiring unit 207 acquires such a stopping signal as a temporal stopping operation from the input apparatus such as either the operation panel of the picture reproducing apparatus 200 or the remote controller 220, the reproduction stopping position designating unit 208 acquires the scene changing point information stored in the scene changing point information storage unit 205 (step S301). In the scene changing point information acquired in the step S301, a level "L" of a scene changing point is set to "0" (step S302), and then, a time duration up to the nearest scene changing point having a level lower than, or equal to the level "L" is displayed on the display screen 230 (step S303). If the user cannot satisfy the remaining time displayed on the display screen 230, then the use again depresses the temporal stopping button after reproduction, and a judgment is made as to whether or not this button is depressed (step S304). In the case that the button is depressed in the step S304, namely, in such a case that the user cannot satisfy the remaining time displayed on the display screen 230, a judgment is made as to whether or not the level "L" of the scene changing point exceeds a maximum level "MAX" set by the changing point level setting unit 203 (step S305). Subsequently, only in such a case that the level "L" of the scene changing point does not exceed the maximum level "MAX", this level "L" of the scene changing point is increased by "1" (step S306). Thereafter, the process operations are returned to the previous step S303 at which a time duration up to the nearest scene changing point as to a new level lower than, or equal to the level "L" is displayed on the display screen 230, and then, the process operations are repeatedly carried out. In the case that the level "L" of the scene changing point exceeds the maximum level MAX in the step S305, the process operations are returned to the previous step S302 at which the level "L" of this scene changing point is returned to "0", and then, the process operations are repeatedly carried out. In the case that the temporal stopping button after reproduction is not depressed in the step S304, a judgment is made as to whether or not the contents are reproduced up to the scene changing point having the level lower than, or equal to the level "L" displayed in the step S303 (step S307). In such a case that the contents have not yet reproduced up to the scene changing point, the process operation is returned to the previous step S303 at which the process operations are repeatedly carried out. In this step S307, when the contents have been reproduced up to the scene changing point, the reproducing operation is temporarily stopped at this scene changing point (step S308). Then, the process operations are ended.

FIG. 4 is a diagram for schematically showing a reproduction restarting function with employment of a scene changing point of contents, according to the present invention. In this drawing, an abscissa indicates a time, and an ordinate shows a detection value of a scene changing point. As to the contents, changing points of scenes are automatically detected by the scene changing point detecting unit 204 for judging changing points of scenes. In this case, since a plurality of threshold values are set, levels may be given to scene changing points. That is, when a detection value of a scene changing point exceeds a threshold value "0" of a level "0", it is assumed that this scene changing point is set as a level "0."

Figure 9:
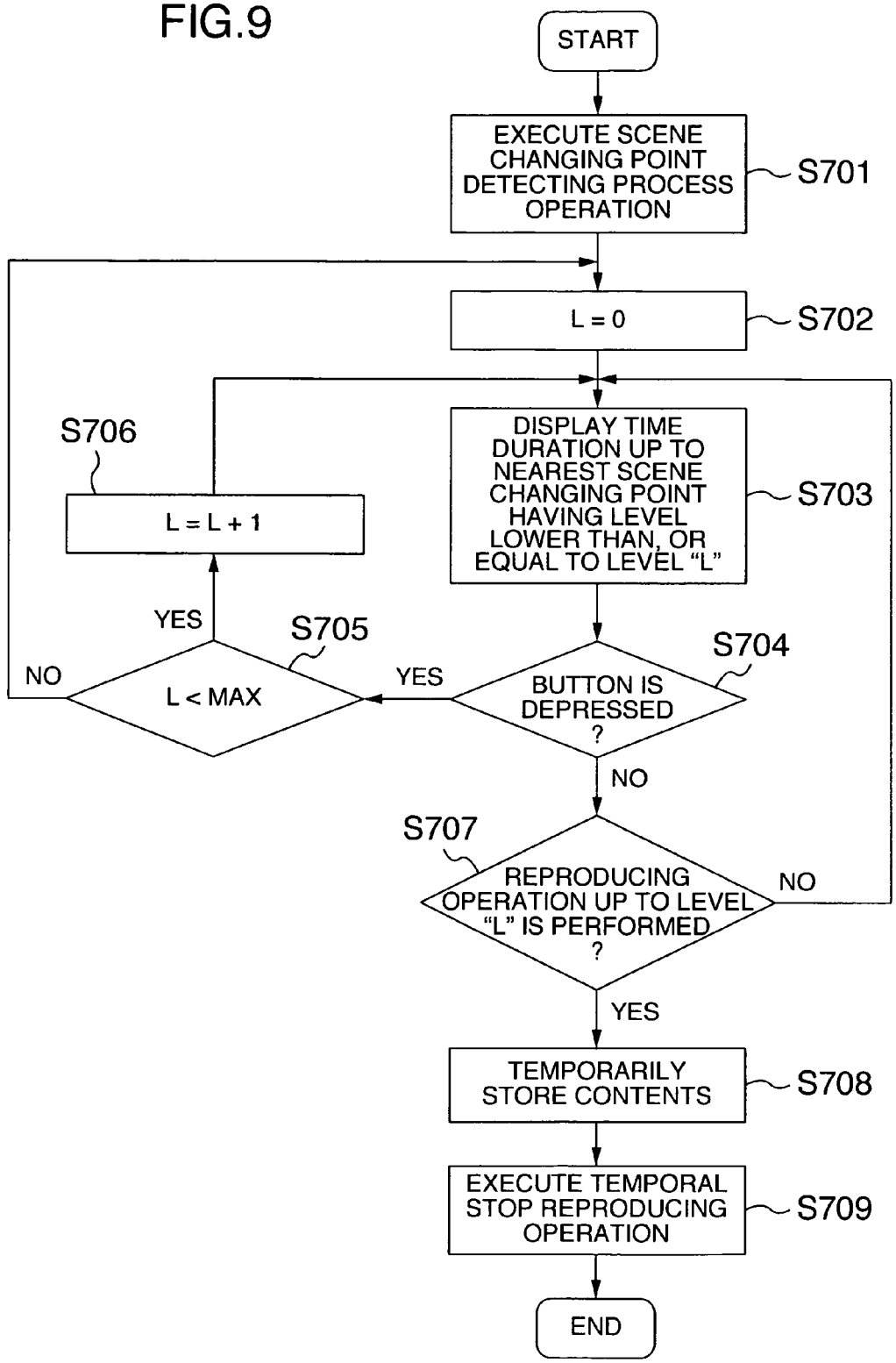
FIG. 9 is a flow chart for describing sequential processing operations of the temporal stopping function in the picture reproducing apparatus according to the fourth embodiment of the present invention.

Also, when a detection value of a scene changing point exceeds a threshold value "1" of a level "1", it is assumed that this scene changing point is set as a level "1." Further, when a detection value of a scene changing point exceeds a threshold value "2" of a level "2", it is assumed that this scene changing point is set as a level "2." Alternatively, both a scene changing point and a level thereof may be given to contents as additional information such as meta data. In FIG. 9, since detection values of scene changing points "901" and "902" exceed the threshold value "0", these scene changing points become the scene changing point of the level "0." Since a detection value of a scene changing point 911 exceeds the threshold value "1", this scene changing point constitutes the scene changing point of the level "1." Further, since detection values of scene changing points 921, 922, 923, and 924 exceed the threshold value "2", these scene changing points constitute the scene changing point of the level "2." When the reproducing operation is temporally stopped between the scene changing point 923 of the level 2 and the scene changing point 924 of the level 2, in such a case that a user depresses a reproduction restarting position search button which is provided on the input apparatus such as the operation panel of the main apparatus body, or the remote controller 220, the picture reproducing apparatus 230 according to the first embodiment of the present invention sets a reproduction restarting position to the scene changing point 923 having the level lower than, or equal to the level "2" located at the nearest left-sided position on the time axis, and displays a time duration up to this reproduction restarting position, or a thumbnail image of this scene on the picture display screen 230. In the case that the user wants to retrace the reproduction contents before the above-described scene changing point 923, since the user again depresses the reproduction restarting position search button, the picture reproducing apparatus according to this first embodiment of the present invention sets a reproduction restarting position to the scene changing point 911 having the level lower than, or equal to the level "1" located at the nearest position from the user instructed position, and again displays either a time duration up to this reproduction restarting position or a thumbnail image of this scene on the picture display screen 230. In the case that the user wants to furthermore retrace the reproduction contents before the above-described scene changing point 911, since the user again depresses the reproduction restarting position search button, the picture reproducing apparatus according to this first embodiment of the present invention sets a reproduction restarting position to the scene changing point 901 having the level "0" located at the nearest position from the user instructed position, and gain displays either a time duration up to this reproduction restarting position or a thumbnail image of this scene on the picture display screen 230. When the user can find out favorite reproduction restarting position, since the user depresses the reproduction restarting button provided on the input apparatus such as the operation panel of the apparatus main body or the remote controller 220, the picture reproducing apparatus can restart the reproducing operation from the set reproduction restarting position. As previously explained, the user repeatedly depresses the reproduction restarting button, so that the reproduction restarting position can be changed. As previously described in this first embodiment, the stepwise levels are given to the scene changing points, and the user selects these levels, so that the reproduction restarting positions can be determined based upon situations of the user. Alternatively, a band-shaped meter for indicating a time duration may be employed so as to display the time duration until the reproduction restarting operation. As a result of this band-shaped meter, the time duration until the reproduction restarting operation may be visually grasped by the user. Also, this first embodiment has exemplified such an example that the higher the level of the scene changing point is increased, the smaller the threshold value is decreased. Apparently, the lower the level of the scene changing point may be decreased, the smaller the threshold value may be decreased.

Next, reproduction restarting operations will now be explained in detail with reference to FIG. 5.

FIG. 5 is a flow chart for explaining sequential process operations as to the reproduction restarting operations executed in the picture reproducing apparatus 200 in the case that the user depresses the reproduction restarting position searching button when the reproduction of the contents is temporarily-stopped. It should also be noted that as to scene changing point information, scene changing points of contents stored in the contents storage unit 202 have been detected by the scene changing point detecting unit 204, and the detected scene changing points have been previously stored in the scene changing point information storage unit 205. In the case that the user wants to restart a reproducing operation from a temporal stopping operation, the user depresses the reproduction restarting position searching button which is provided on the input apparatus such as either the operation panel of the picture reproducing apparatus 200 or the remote controller 220. In response to this button depressing operation, the process operations shown in FIG. 5 are carried out. When the reproduction stopping signal acquiring unit 207 acquires such a reproduction restarting position searching signal derived from the input apparatus such as either the operation panel of the picture reproducing apparatus 200 or the remote controller 220, the reproduction stopping position designating unit 208 acquires the scene changing point information stored in the scene changing point information storage unit 205 (step S1101). In the scene changing point information acquired in the step S1101, a level "L" of a scene changing point is set to the maximum level MAX set by the changing point level setting unit 203 (step S1102), either a time duration up to the nearest scene changing point having the level lower than, or equal to the level "L", or a thumbnail image of this scene is displayed on the display screen 230 (step S1103). If this user cannot satisfy either the remaining time or the thumbnail image displayed on the display screen 230, then the user again depresses the reproduction restarting position searching button (button "A"), and a judgment is made as to whether or not this button "A" is depressed (step S1101).

In the case that the button "A" is depressed in the step S1101, namely, in such a case that the user cannot satisfy the remaining time, or the thumbnail image displayed on the display screen 230, a judgment is made as to whether or not the level "L" of the scene changing point is larger than "0" (step S1105). Subsequently, only when the level "L" of the scene changing point is larger than 0, this level "L" of the scene changing point is decreased by "1" (step S1106). Thereafter, the process operations are returned to the previous step S1103 at which either a time duration or a thumbnail image of this scene-up to the nearest scene changing point having a new level lower than, or equal to the level "L" is displayed on the display screen 230, and then, the process operations are repeatedly carried out. In the case that the level "L" of the scene changing point is lower than, or equal to "0" in the step S1105, the process operations are returned to the previous step S1102 at which the level "L" of this scene changing point is returned to the maximum level "MAX", and then, the process operations are repeatedly carried out. In the case that the button "A" is not depressed in the step S1101, another judgment is made as to whether or not a reproduction restarting button (button "B") is depressed which is provided on the input apparatus such as the operation panel of the picture reproducing apparatus 200, or the remote controller 220 (step S1107). In the case that the button "B" is not depressed, the process operations are returned to the previous step S1103 at which the process operations are repeatedly carried out. In the step S1107, when the button "B" is depressed, the picture reproducing apparatus 200 retraces the reproduction contents up to this scene changing point, and restarts the reproducing operation (step S1108). Then, the reproduction restarting process operations are ended.

As previously explained, in this first embodiment, the reproducing operation is temporarily stopped at the scene changing point after the temporal stopping button is depressed, and then, the reproducing operation is reproduced from the preceding scene changing point at such a time instant when the reproduction restarting button is depressed. As a result, in this first embodiment, the user may view the same scene in the repetition manner, and thus, even in such a case that the user leaves halfway through the picture contents for a relatively long time, the user may easily understand the contents of the scene.

Alternatively, the reproducing operation may be temporarily stopped at such a scene changing point after a time instant when the temporal stopping button is depressed, and then, the reproducing operation may be restarted from a time instant when the reproduction restarting button is depressed. In this alternative case, the user may view the contents of the scene until a better scene cutting point, and the reproducing operation may be restarted from this time instant. As a result, the user may readily understand the contents of the scene without viewing the same scene in the repetition manner.

Furthermore, the reproducing operation may be temporarily stopped at a time instant when the temporal stopping button is depressed, and the reproducing operation may be restarted from a scene changing point before such a time instant when the reproduction restarting button is depressed. In this alternative case, although the reproducing operation may be immediately and temporarily stopped, since the reproducing operation is restarted from the previous scene changing point, the user may remember the contents of the scene, and the user may easily understand the contents of the scene.

Also, in this first embodiment, the levels of the reference for determining the scene changing points (for instance, difference in luminance values of preceding/succeeding frames of moving picture) have been set to 3 stages, and the user has selected this level by using the remote controller 220. Alternatively, the user may select this reference by manipulating the remote controller 220. For instance, the reference may be changed into a difference in color histogram of preceding/succeeding frames of a moving picture from the difference in the luminance values of the preceding/succeeding frames of the moving picture. As a consequence, a proper reference may be selected from contents. Apparently, a proper reference may be automatically set.

Although both the temporal stopping operation and the reproduction restarting operation have been exemplified in this first embodiment, the present invention may be apparently applied to a normal stopping operation and a normal reproducing operation.

It should also be noted that the contents storage unit 202 is built in the picture reproducing apparatus 200 in this first embodiment. Alternatively, external storage apparatus such as rewritable DVD media, media cards, and USB memories may be employed. As a result, various modes of storage apparatus may be used in a replaceable manner, depending upon desires of the user. Furthermore, maintenance and checks of the recording apparatus may be readily performed. Also, in such a case that contents from which scene changing points have not yet been detected are reproduced among the contents stored in the contents storage unit 202, since the scene changing point is sequentially detected with respect to the preceding contents data only for a predetermined time when the reproducing operation is carried out, the picture reproducing operation of the picture reproducing apparatus of this first embodiment may be alternatively carried out. For example, while a decoder capable of decoding data in a multiple decoding speed is mounted on the picture reproducing apparatus, contents may be alternatively read in a fast reading mode so as to detect scene changing points, and/or after a scene changing point detecting operation is carried out with respect to contents data which are expanded in a memory, the resulting contents data may be alternatively reproduced. In this alternative case, the scene changing point information acquired by the scene changing point detecting unit 204 may be directly supplied to the reproduction stopping position designating unit 208. Since these alternative operations are carried out, the scene changing points can be quickly detected.

In accordance with this first embodiment, the user can automatically and temporarily stop, and can automatically restart the reproducing operation with respect to the contents recorded on the recording apparatus such as an HDD decoder and a DVD decoder at the favorable scene cutting position without losing the good timing. Also, since the time durations up to the temporal stopping position and the reproduction restarting position are notified to the user, the user can grasp how long the user should wait. If the user cannot satisfy the displayed waiting time, then user may further shorten and/or prolong the position where the reproducing operation is temporarily stopped, so that the user friendly characteristic of the picture reproducing apparatus 200 may be improved.

Embodiment 2

A second embodiment of the present invention is featured by that in the picture reproducing apparatus of the above-explained first embodiment, when contents are acquired, a scene changing point detecting process operation of the contents is carried out. It should be noted that a temporal stopping function and a reproduction restarting function by detecting a scene changing point of a content, according to this second embodiment, are substantially identical to those of the above-described first embodiment.

Next, the second embodiment of the present invention will now be explained with reference to FIG. 6 which schematically shows an arrangement of the picture reproducing apparatus 200 of this second embodiment.

Figure 6:
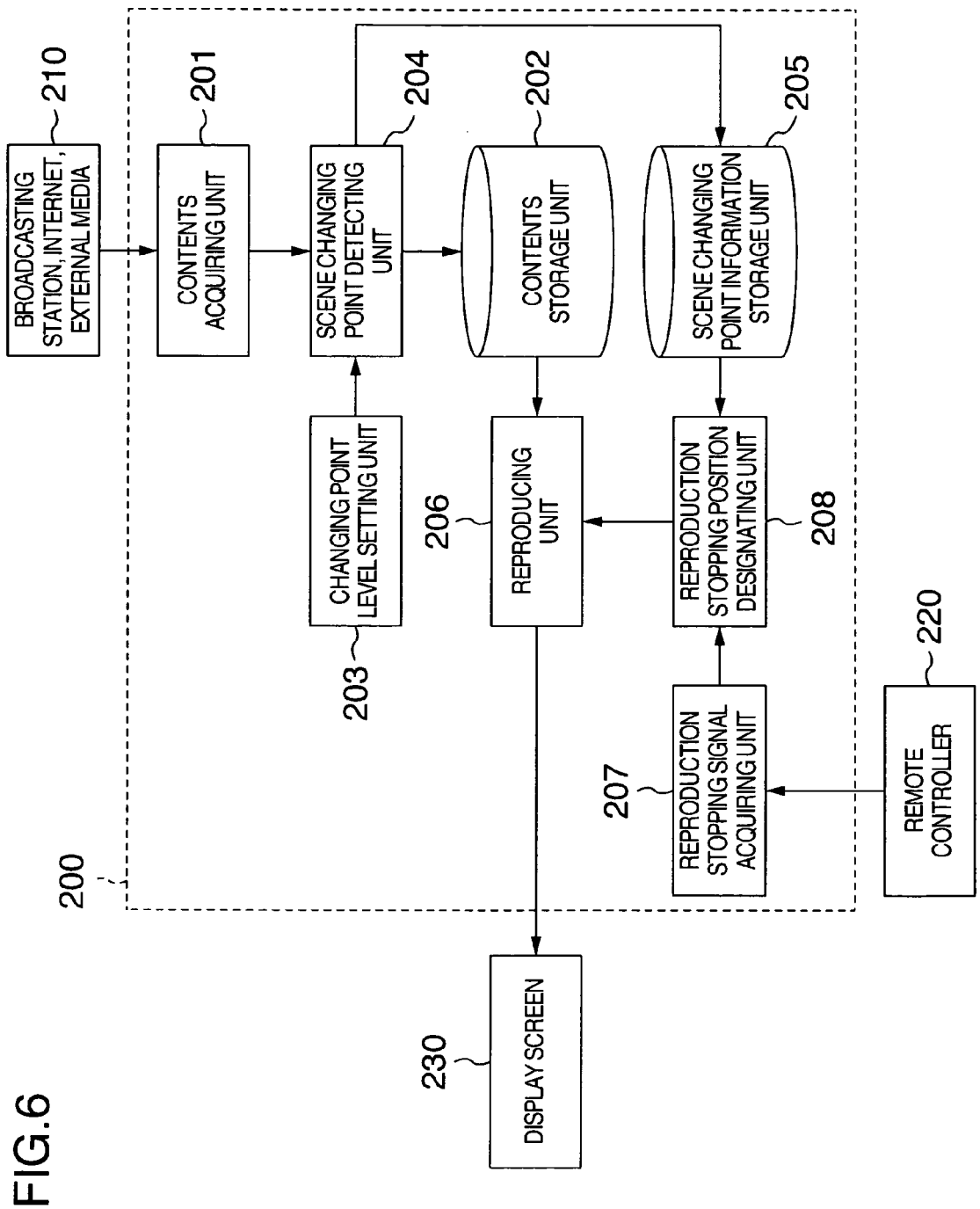
FIG. 6 is a block diagram for indicating an arrangement of a picture reproducing apparatus according to a second embodiment of the present invention.

It should also be noted that the same reference numerals shown in FIG. 2 will be employed as those for denoting the same, or similar structural elements represented in FIG. 6.

Although the scene changing point detecting operation has been carried out with respect to the content data which has been once stored in the first embodiment, a scene changing point detecting operation is carried out when contents data is acquired, and thereafter, the processed contents data is stored in this second embodiment. In other words, when the contents are acquired by the contents acquiring unit 201, the scene changing point detecting unit 204 detects a scene changing point based upon a changing point level set by the changing level setting unit 203 so as to perform the scene changing point detecting operation, and then, scene changing point information thereof is stored in the scene changing point information storage unit 205.

In accordance with this second embodiment, since the scene changing point detecting operation is carried out when the contents are acquired, the scene changing point information is necessarily present when the reproducing operation of the content data is performed, so that a load given to the picture reproducing apparatus 200 can be reduced, as compared with the load given in such a case that the scene changing point is acquired during the reproducing operation.

Embodiment 3

A third embodiment of the present invention is featured by that in the picture reproducing apparatus 200 of the above-explained first embodiment, scene changing point information of the contents is acquired from an external contents source of this picture reproducing apparatus 200, for example, a broadcasting station, or the Internet. It should be noted that a temporal stopping function and a reproduction restarting function by detecting a scene changing point of a content, according to this third embodiment, are substantially identical to those of the above-described first embodiment.

Next, the third embodiment of the present invention will now be explained with reference to FIG. 7.

Figure 7:
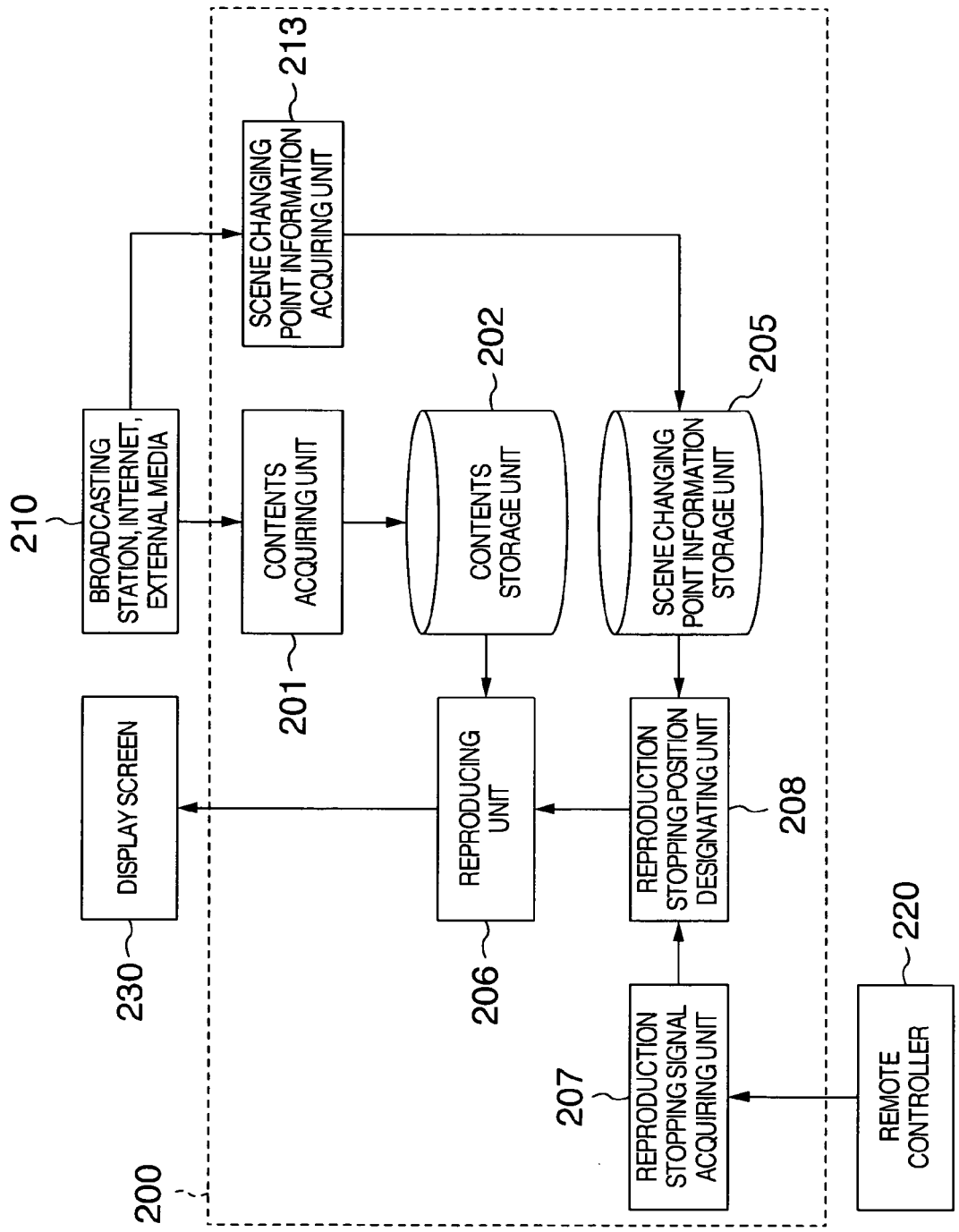
FIG. 7 is a block diagram for indicating an arrangement of a picture reproducing apparatus according to a third embodiment of the present invention.

FIG. 7 is a schematic block diagram for representing an arrangement of the picture reproducing apparatus 200 of this third embodiment. It should also be understood that the same reference numerals shown in FIG. 2 will be employed as those for denoting the same, or similar structural elements represented in FIG. 7. In this picture reproducing apparatus 200, a scene changing point information acquiring unit 213 is newly provided, while this scene changing point information acquiring unit 213 acquires scene changing point information from the contents provider 210.

In the first embodiment, the scene changing point detecting operation has been carried out with respect to the contents data which has been once stored. In this third embodiment, scene changing point information of the relevant contents is acquired from the contents provider 210. In other words, the contents are acquired by the contents acquiring unit 201, and the same time, the scene changing point information with respect to the acquired contents is acquired by the scene contents changing point acquiring unit 213.

Although the contents are acquired and, at the same time, the scene changing point information is also acquired in this third embodiment, the contents and the scene changing point information may not be alternatively acquired at the same time. For example, when the reproduction stopping signal is acquired by the reproduction stopping signal acquiring unit 207, the scene changing point information may be alternatively acquired by the scene changing point information acquiring unit 213. In this alternative case, the acquired scene changing point information need not be stored in the scene changing point information storage unit 205, but may be directly supplied to the stopping position designating unit 208. As a result, the scene changing point may be quickly utilized to the reproducing operation and the temporal stopping operation.

Also, the contents provider may alternatively and previously embed the scene changing point information in the contents data as meta data when the contents are distributed. Furthermore, another method may be alternatively employed by which while the meta data is previously set to a server, or the like, the user many refer the meta data if necessary. As a consequence, the scene changing point may be delivered to a person who wants the scene changing points, so that there is such a merit that an efficiency of a data transmission may be increased.

In accordance with this third embodiment, since the scene changing point information is acquired from the external source, the scene changing point detecting operation is no longer performed inside the picture reproducing apparatus, so that the load given to this picture reproducing apparatus can be reduced.

Embodiment 4

A fourth embodiment of the present invention is featured by that in such a case that only a reproducing operation of contents data is carried out without storing the contents data, namely only a viewing operation of the contents data is carried out, but is not recorded, the temporal stopping operation after reproduction, and the reproduction restarting function, according to the present invention, are carried. It should be understood that a temporal stopping function and a reproduction restarting function by detecting a scene changing point of a content, according to this fourth embodiment, are substantially identical to those of the above-described first embodiment.

Next, a description is made of a picture reproducing apparatus 200 according to the fourth embodiment of the present invention with reference to FIG. 8 to FIG. 11.

Figure 8:
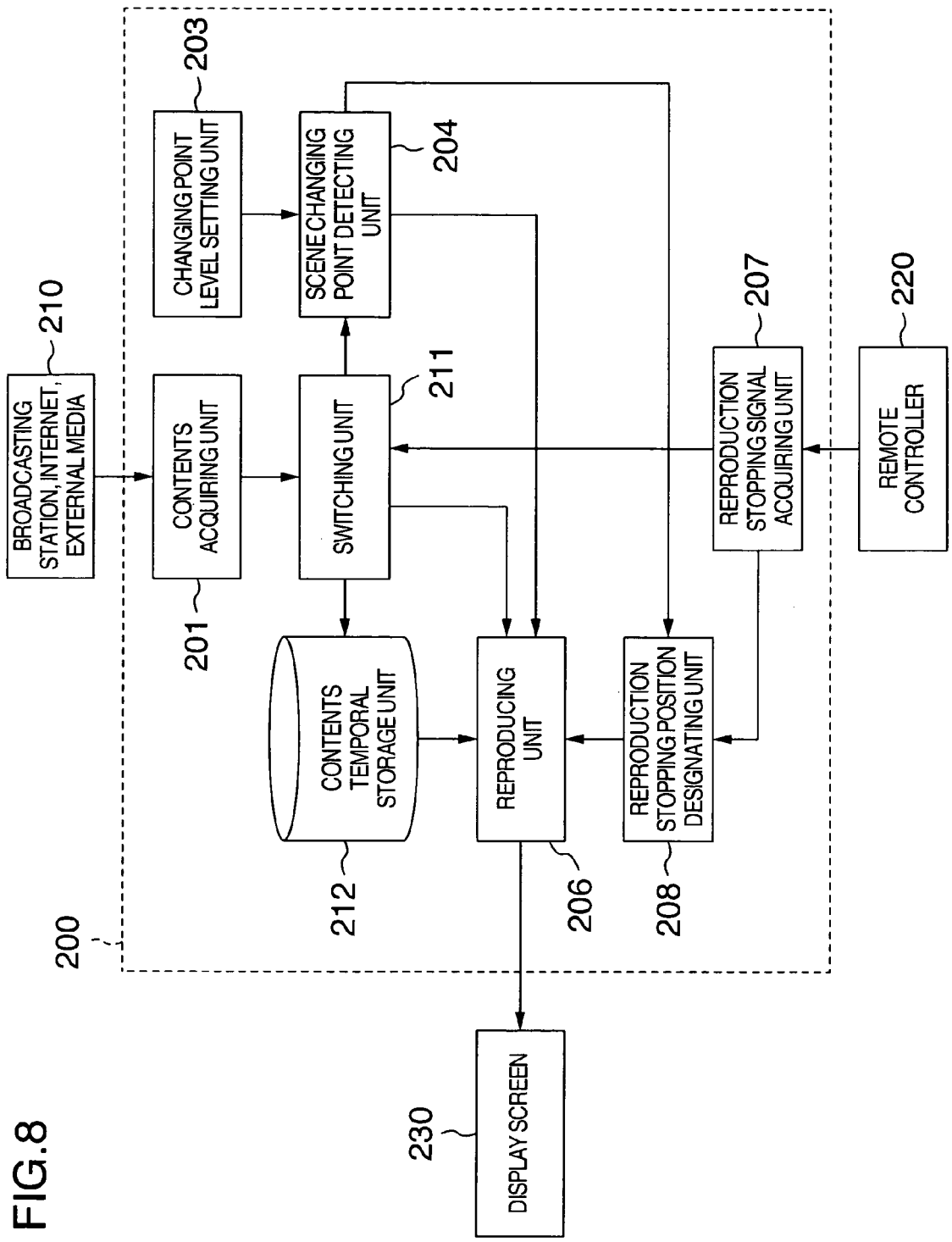
FIG. 8 is a block diagram for representing an arrangement of a picture reproducing apparatus when a temporal stopping function is used, according to a fourth embodiment of the present invention.
Figure 10:
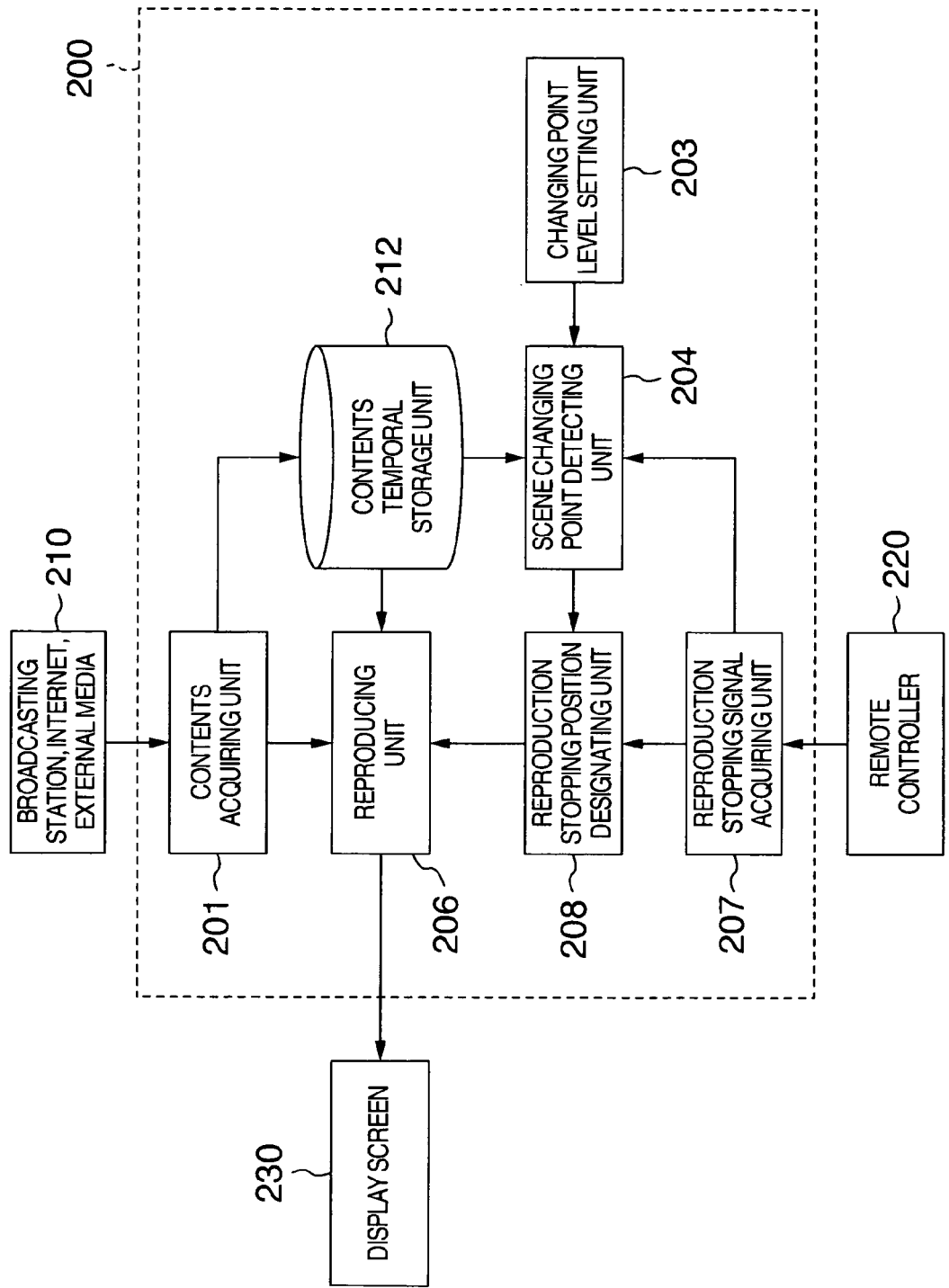
FIG. 10 is a block diagram for representing an arrangement of the picture reproducing apparatus when a reproduction starting function is used, according to the fourth embodiment of the present invention.
Figure 11:
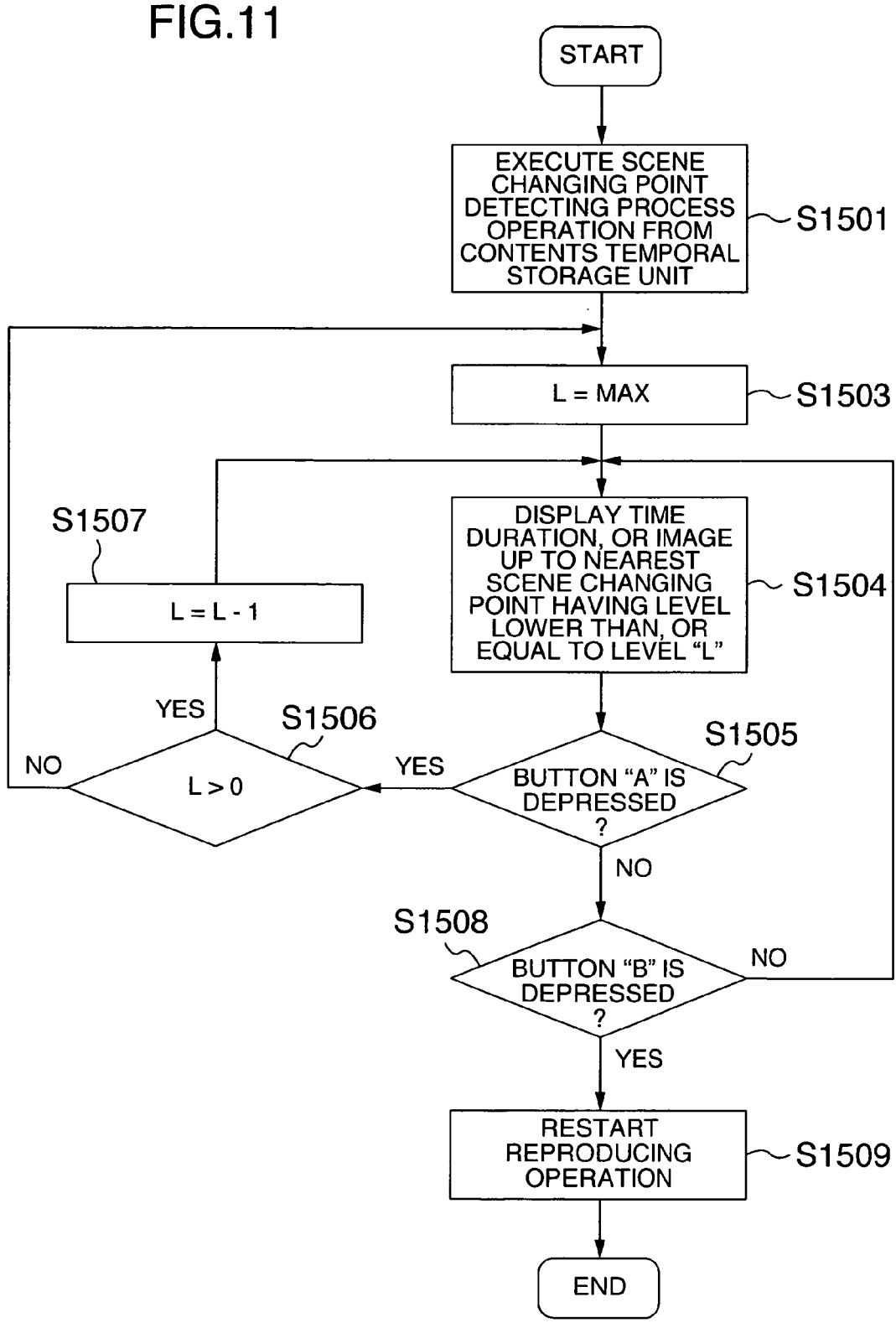
FIG. 11 is a flow chart for explaining sequential processing operations of the reproduction restarting function in the picture reproducing apparatus according to the fourth embodiment of the present invention.

FIG. 8 is a block diagram for indicating an arrangement of the picture reproducing apparatus 200 according to this fourth embodiment in the case that a temporal stopping function after reproduction thereof is employed. FIG. 9 is a flow chart for representing sequential process operations in the case that a temporal stopping operation after reproduction is carried out when contents are reproduced in this fourth embodiment. Also, FIG. 10 is a block diagram for indicating an arrangement of the picture reproducing apparatus 200 according to this fourth embodiment in the case that a reproduction restarting function thereof is employed. FIG. 11 is a flow chart for representing sequential process operations in the case that a reproduction restarting operation is carried out when contents are temporally stopped in this fourth embodiment.

FIG. 8 is a block diagram for indicating the arrangement of the picture reproducing apparatus 200 according to this fourth embodiment in the case that the temporal stopping function after reproduction thereof is employed. It should be understood that the same reference numerals shown in FIG. 2 will be employed as those for indicating the structural elements shown in FIG. 8. In this fourth embodiment, a switching unit 211 and a contents temporal storage unit 212 are newly provided with the picture reproducing apparatus 200. That is, when a stopping signal is acquired by the reproduction stopping signal acquiring unit 207, the switching unit 211 supplies contents data acquired by the contents acquiring unit 201 to the scene changing point detecting unit 204. The contents temporal storage unit 212 temporarily stores thereinto such contents data after the stopping position.

Next, operations of the picture reproducing apparatus 200 according to this fourth embodiment will now be described in detail.

FIG. 9 is a flow chart for explaining sequential process operations of a temporal stopping operation after reproduction executed in the above-explained picture reproducing apparatus 200 in such a case that the user depresses the temporal stopping button after reproduction when contents are reproduced. In the case that the user wants to leave halfway through a viewing operation of contents, the user depresses the temporal stopping button after reproduction which is provided on the input apparatus such as either the operation panel of the picture reproducing apparatus 200 or the remote controller 220. In response to this button depressing operation, the process operations shown in FIG. 7 are carried out. When the stop signal acquiring unit 207 acquires such a stopping signal as a temporal stopping operation from the input apparatus such as either the operation panel of the picture reproducing apparatus 200 or the remote controller 220, the switching unit 211 transfers contents data acquired by the contents acquiring unit 201 to the scene changing point detecting unit 204.

The scene changing point detecting unit 204 detects a scene changing point in accordance with the changing point level setting unit 203 as to the contents data transferred from the switching unit 211, and then, transfers the scene changing point information to the reproduction stopping position designating unit 208 (step S701). The contents data detected by the scene changing point detecting unit 204 is supplied to the reproducing unit 206 so as to continue the reproducing operation of the contents. It should also be noted that when a scene changing point is detected, since a scene changing point detecting operation is sequentially carried out with respect to preceding contents data only for a predetermined time duration, this fourth embodiment may be carried out. For example, while the preceding contents data for the predetermined time duration is acquired from the contents acquiring unit 201 in advance, and also, a decoder equipped with a function of a multiple high decoding speed is mounted on the picture reproducing apparatus, the acquired contents data may be quickly read so as to detect a scene changing point. Alternatively, after a scene changing point has been detected with respect to contents data explained in a memory, the resulting contents data may be reproduced. The reproduction stopping position designating unit 208 sets a level "L" of a scene changing point in the above-described scene changing point information to "0" (step S702), and then, displays a time duration up to the nearest scene changing point having a level lower than, or equal to the level "L" is displayed on the display screen 230 (step S703). If the user cannot satisfy the remaining time displayed on the display screen 230, then the user again depresses the temporal stopping button after reproduction, and a judgment is made as to whether or not this button is depressed (step S704). In the case that the button is depressed in the step S704, namely, in such a case that the user cannot satisfy the remaining time displayed on the display screen 230, a judgment is made as to whether or not the level "L" of the scene changing point exceeds a maximum level "MAX" set by the changing point level setting unit 203 (step S705). Subsequently, only in such a case that the level "L" of the scene changing point does not exceed the maximum level "MAX", this level "L" of the scene changing point is increased by "1" (step S706). Thereafter, the process operations are returned to the previous step S703 at which a time duration up to the nearest scene changing point as to a new level lower than, or equal to the level "L" is displayed on the display screen 230, and then, the process operations are repeatedly carried out. In the case that the level "L" of the scene changing point exceeds the maximum level MAX in the step S705, the process operations are returned to the previous step S702 at which the level "L" of this scene changing point is returned to "0", and then, the process operations are repeatedly carried out. In the case that the temporal stopping button after reproduction is not depressed in the step S704, a judgment is made as to whether or not the contents are reproduced up to the scene changing point having the level lower than, or equal to the level "L" displayed in the step S703 (step S707). In such a case that the contents have not yet been reproduced up to the scene changing point, the process operations are returned to the previous step S703 at which the process operations are repeatedly carried out. In this step S707, when the contents have been reproduced up to the scene changing point, a temporal storage operation as to the contents data from this scene changing point is commenced by the contents temporal storage unit 212 (step S708). Thereafter, this temporal storage operation is temporarily stopped at this scene changing point (step S709), and then, the process operations are ended. It should also be understood that when the reproducing operation of the contents data is restarted, the contents data which has been temporarily stored in the contents temporal storage unit 212 is reproduced.

FIG. 10 is a block diagram for indicating an arrangement of the picture reproducing apparatus 200 according to this fourth embodiment in the case that a reproduction restarting function is employed. It should be understood that the same reference numerals shown in FIG. 2 and FIG. 8 will be employed as those for denoting the same, or similar structural elements indicated in FIG. 10. Referring now to FIG. 11, operations of the picture reproducing apparatus 200 according to this fourth embodiment will be described in detail.

FIG. 11 is a flow chart for explaining sequential process operations as to the reproduction restarting operations executed in the picture reproducing apparatus 200 in the case that the user depresses the reproduction restarting position searching button when the reproduction of the contents is temporarily stopped. In such a case that the user wishes to restart a reproducing operation from a temporal stopping operation, the user depresses the reproduction restarting position searching button which is provided on the input apparatus such as either the operation panel of the picture reproducing apparatus 200 or the remote controller 220. In response to this button depressing operation, the process operations shown in FIG. 11 are carried out. When the reproduction stopping signal acquiring unit 207 acquires such a reproduction restarting position searching signal derived from the input apparatus such as either the operation panel of the picture reproducing apparatus 200 or the remote controller 220, the scene changing point detecting unit 204 detects a scene changing point in accordance with the changing point level setting unit 203 with respect to the contents data which has been temporarily stored in the data storage unit 212 from the starting time of the reproducing operation, and then, transfers the scene changing point information to the reproduction stopping position designating unit 208 (step S1501).

In the scene changing point information acquired in the step S1501, a level "L" of a scene changing point is set to the maximum level "MAX" set by the changing point level setting unit 203 (step S1502), either a time duration up to the nearest scene changing point having the level lower than, or equal to the level "L", or a thumbnail image of this scene is displayed on the display screen 230 (step S1503). If this user cannot satisfy either the remaining time or the thumbnail image displayed on the display screen 230, then the user again depresses the reproduction restarting position searching button (button "A"), and a judgment is made as to whether or not this button "A" is depressed (step S1504). In the case that the button "A" is depressed in the step S1504, namely, in such a case that the user cannot satisfy the remaining time, or the thumbnail image displayed on the display screen 230, a judgment is made as to whether or not the level "L" of the scene changing point is larger than "0" (step S1505). Subsequently, only when the level "L" of the scene changing point is larger than 0, this level "L" of the scene changing point is decreased by "1" (step S1506). Thereafter, the process operations are returned to the previous step S1503 at which either a time duration or a thumbnail image of this scene up to the nearest scene changing point having a new level lower than, or equal to the level "L" is displayed on the display screen 230, and then, the process operations are repeatedly carried out. In the case that the level "L" of the scene changing point is lower than, or equal to "0" in the step S1605, the process operations are returned to the previous step S1502 at which the level "L" of this scene changing point is returned to the maximum level "MAX", and then, the process operations are repeatedly carried out. In such a case that the button "A" is not depressed in the step S1504, another judgment is made as to whether or not a reproduction restarting button (button "B") is depressed which is provided on the input apparatus such as the operation panel of the picture reproducing apparatus 200, or the remote controller 220 (step S1507). In the case that the button "B" is not depressed, the process operations are returned to the previous step S1503 at which the process operations are repeatedly carried out. In the step S1507, when the button "B" is depressed, the picture reproducing apparatus 200 retraces the reproduction contents up to this scene changing point, and restarts the reproducing operation (step S1508). Then, the reproduction restarting process operations are ended.

In accordance with this fourth embodiment, in such a case that only the reproducing operation of the contents data is carried out without storing the contents data, namely, even in such a case that only the viewing operation of the contents data is performed, but the content data is not recorded, the inventive idea of the present invention may be carried out.

Embodiment 5

A fifth embodiment of the present invention is featured by that in the picture reproducing apparatus of the above-explained fourth embodiment, scene changing point information of contents is acquired from an external source of this picture reproducing apparatus 200. It should be noted that a temporal stopping function by detecting a scene changing point of a content, according to this fifth embodiment, is substantially identical to that of the above-described first embodiment.

Figure 12:
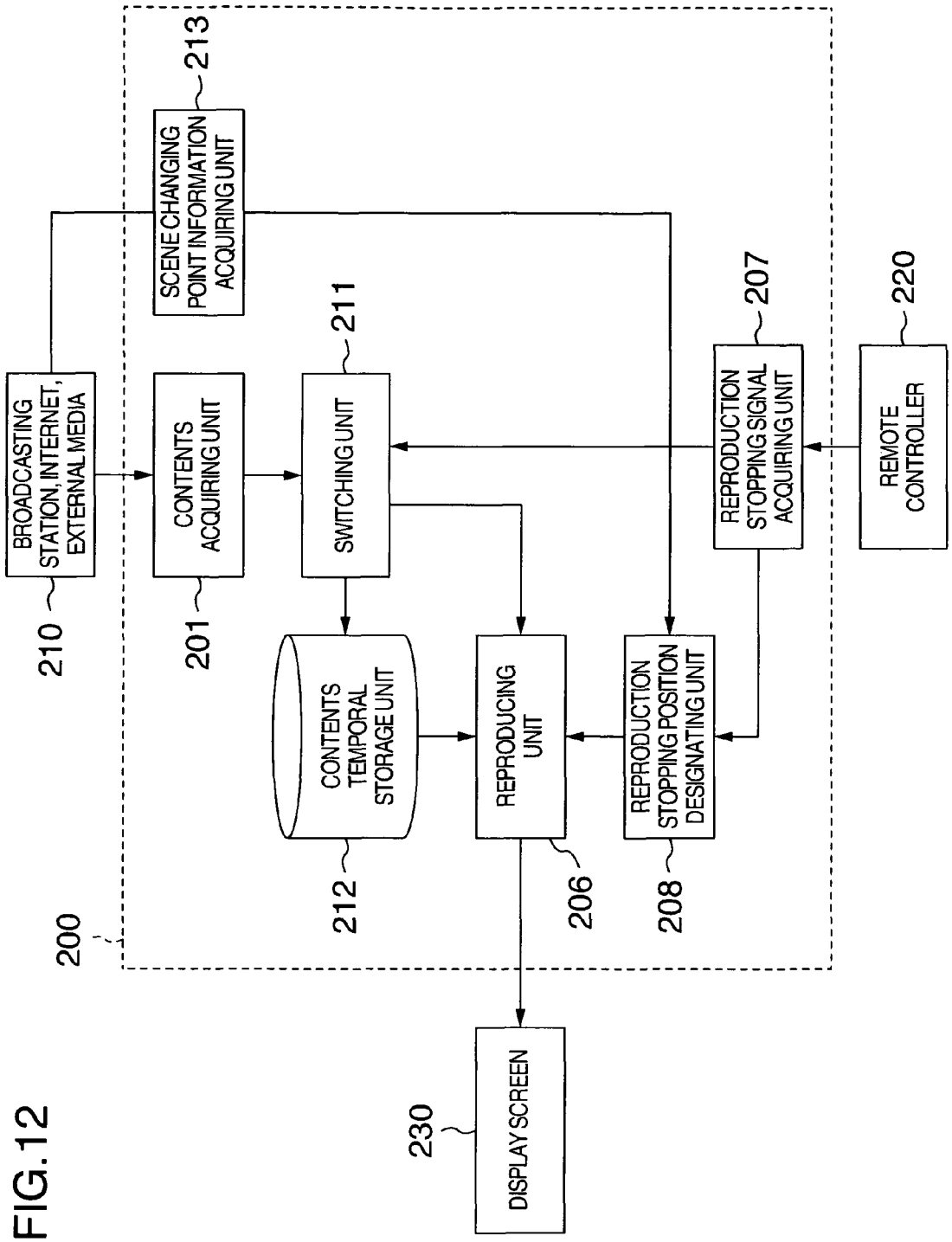
FIG. 12 is a block diagram for representing an arrangement of a picture reproducing apparatus when a temporal stopping function is used, according to a fifth embodiment of the present invention.

Next, a description is made of a picture reproducing apparatus 200 according to the fifth embodiment of the present invention with reference to FIG. 12 and FIG. 13.

FIG. 12 is a block diagram for indicating an arrangement of the picture reproducing apparatus 200 according to this fifth embodiment in the case that a temporal stopping function thereof is employed. FIG. 13 is a block diagram for showing an arrangement of the picture reproducing apparatus according to this fifth embodiment in the case that a reproduction restarting function is employed. It should be understood that the same reference numerals shown in FIG. 2, FIG. 7, FIG. 8 will be employed as those for indicating the structural elements shown in FIG. 12.

In this fifth embodiment, scene changing point information of the relevant contents is acquired from the contents provider 210. In other words, when the reproduction stopping signal acquiring unit 207 acquires a stopping signal, the scene changing point information acquiring unit 213 acquires such a scene changing point information with respect to contents under reproduction, and then, transfers this acquired scene changing point information to the stopping position designating unit 208.

It should also be noted that the contents may be alternatively acquired, and at the same time, the scene changing point information may be alternatively acquired. In this alternative case, the acquired scene changing point information must be stored in a temporal storage apparatus such as a memory.

It should also be understood that the same reference numerals indicated in FIG. 2, FIG. 7, FIG. 8 will be employed as those for denoting the same, or similar structural elements represented in FIG. 13.

In FIG. 13, scene changing point information of the relevant contents is acquired from an external source such as the contents provider 210. In other words, when the reproduction stopping signal acquiring unit 207 acquires a reproduction restarting position searching signal, the scene changing point information acquiring unit 213 acquires such a scene changing point information with respect to contents under reproduction, and then, transfers this acquired scene changing point information to the stopping position designating unit 208.

It should also be noted that the contents may be alternatively acquired, and at the same time, the scene changing point information may be alternatively acquired. In this alternative case, the acquired scene changing point information must be stored in a temporal storage apparatus such as a memory.

In accordance with this fifth embodiment, since the scene changing point information is acquired from the external source, the scene changing point is no longer detected inside the picture reproducing apparatus 200, so that the load given to this picture reproducing apparatus 200 can be reduced.

Other aspects of the inventions are defined as follows:

1. A picture reproducing apparatus for reproducing a picture, comprising:

a reproduction control module which controls to stop a reproducing operation and controls the reproducing operation; wherein:

said reproduction control module controls said picture reproducing apparatus in such a manner that when a user performs a stopping operation of a picture under reproduction, the reproducing operation of said picture under reproduction is stopped at a time instant which is different from said time instant when the user performs the stopping operation of the picture under reproduction; and when the user performs a reproducing operation, the reproducing operation is carried out at the time instant when the reproducing operation of the picture is stopped.

2. A picture reproducing apparatus for reproducing a picture, comprising:

a reproduction control module which controls to stop a reproducing operation and controls the reproducing operation; wherein:

said reproduction control module controls said picture reproducing apparatus in such a manner that when a user performs a stopping operation of a picture under reproduction, the reproducing operation of said picture under reproduction is stopped at a time instant when the user performs the stopping operation of the picture under reproduction; and when the user requests a reproducing operation, the reproducing operation is carried out at a time instant different from the time instant when the reproducing operation of the picture is stopped.

3. A picture reproducing apparatus for reproducing a picture, comprising:

a reproduction control module which controls to stop a reproducing operation and controls the reproducing operation; wherein:

said reproduction control module controls said picture reproducing apparatus in such a manner that when a user performs a stopping operation of a picture under reproduction, the reproducing operation of said picture under reproduction is stopped at a time instant which is different from said time instant when the user performs the stopping operation of the picture under reproduction; and when the user performs a reproducing operation, the reproducing operation is carried out at a time instant different from the time instant when the reproducing operation of the picture is stopped.

4. A picture reproducing apparatus for reproducing a picture, comprising:

a reproduction control module which controls to stop a reproducing operation and controls the reproducing operation; wherein:

said reproduction control module controls said picture reproducing apparatus in such a manner that when a user performs a reproducing operation, the reproducing operation of the picture is commenced at a time instant which is different from said time instant when the user performs the reproducing operation.

5. A picture reproducing apparatus for reproducing a picture, comprising:

a reproduction control module which controls to stop a reproducing operation and controls the reproducing operation; wherein:

said reproduction control module controls said picture reproducing apparatus in such a manner that when a user performs a stopping operation of a picture under reproduction, the reproducing operation of said picture under reproduction is stopped at a scene which is different from a scene when the user performs the stopping operation of the picture under reproduction; and when the user performs a reproducing operation, a reproducing operation is carried out from such a scene when the reproducing operation of the picture is stopped.

6. A picture reproducing apparatus for reproducing a picture, comprising:

a reproduction control module which controls to stop a reproducing operation and controls the reproducing operation; wherein:

said reproduction control module controls said picture reproducing apparatus in such a manner that when a user performs a stopping operation of a picture under reproduction, the reproducing operation of said picture under reproduction is stopped at a scene when the user performs the stopping operation of the picture under reproduction; and when the user requests a reproducing operation, the reproducing operation is carried out from such a scene which is different from the scene when the user stops the reproducing operation of the picture.

7. A picture reproducing apparatus for reproducing a picture, comprising:
a reproduction control module which controls to stop a reproducing operation and controls the reproducing operation; wherein:
said reproduction control module controls said picture reproducing apparatus in such a manner that when a user performs a stopping operation of a picture under reproduction, the reproducing operation of said picture under reproduction is stopped at a scene which is different from a scene when the user performs the stopping operation of the picture under reproduction; and when the user performs a reproducing operation, the reproducing operation is carried out from such a scene which is different from the scene when the user stops the reproducing operation of the picture.

8. A picture reproducing apparatus for reproducing a picture, comprising:
a reproduction control module which controls to stop a reproducing operation and controls the reproducing operation; wherein:
said reproduction control module controls said picture reproducing apparatus in such a manner that when the user performs a reproducing operation, the reproducing operation is carried out from such a scene which is different from the scene when the user performs the reproducing operation of the picture.

9. A transmitting apparatus for transmitting both a signal of a program and a signal of information related to the program, wherein:
said transmitting apparatus transmits information related to a scene changing point where a scene of said program is changed.

10. A transmitting method for transmitting both a signal of a program and a signal of information related to the program, wherein:
said transmitting method is comprised of a step for transmitting information related to a scene changing point where a scene of said program is changed.

11. A transmitting/receiving system comprising:
a transmitting apparatus for transmitting both information relating to a program and information relating to a scene changing point which corresponds to a changing point of a scene of said program; and
a receiving apparatus for receiving both the information relating to the program and the information related to said scene changing point; wherein:
said receiving apparatus is comprised of: a storage module which stores thereinto both the information relating to the program and the information relating to the scene changing point, which are transmitted by said transmitting apparatus; a reproduction control module which controls to reproduce the program and to stop the reproducing operation of the program stored in said storage module; and a scene changing point detecting module which detects a scene changing point from the information related to the scene changing point stored in said storage module; and
said reproduction control module controls said receiving apparatus in such a manner that when a user performs a stopping operation of a picture under reproduction, the picture under reproduction is stopped at the scene changing point acquired by said scene changing point detecting module; and when the user performs a reproducing operation, the reproducing operation of the picture is performed from a time instant when said stopping operation is carried out.

While we have shown and described several embodiments, in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

The invention claimed is:

1. A picture reproducing apparatus for reproducing a picture content, comprising:
a scene changing point judging module which judges a changing point of a scene of the picture content based on a plurality of judging levels defined by threshold values; and
a reproduction control module which controls reproduction of the picture content and stopping reproduction of the picture content;
wherein:
in response to receipt of an instruction for changing one of said plurality of judging levels to another judging level, said reproduction control module shifts a temporal stopping position of the picture content from a current candidate stopping position to another candidate stopping position where feature amount satisfies said another judging level during a time of until when the reproduction of the picture content is stopped from when having received an instruction for stopping the reproduction of the picture content at a scene changing point which said scene changing point judging module has judged based on the one of said plurality of judging levels, and wherein said reproduction control module controls stopping reproduction of the picture content at a scene changing point which is judged based on said another judging level after changing from said one of said plurality of judging levels to said another judging level.

2. A picture reproducing apparatus as claimed in claim 1, wherein:
said scene changing point judging module calculates feature amounts contained in a moving picture signal of each of frames of the picture content under reproduction, and judges the scene changing point based upon a comparison result of the calculated feature amounts of said respective frames of the picture content.

3. A picture reproducing apparatus as claimed in claim 2, wherein:
said feature amounts contain a color histogram of said moving picture signal.

4. A picture reproducing apparatus as claimed in claim 2, wherein:
said feature amounts contain audio information which is read from said moving picture signal.

5. A picture reproducing apparatus as claimed in claim 2, wherein:
said feature amounts contain motion compensating information of said moving picture signal.

6. A picture reproducing apparatus as claimed in claim 2, wherein:
said feature amounts contain a color histogram of said moving picture signal.

7. A picture reproducing apparatus as claimed in claim 2, wherein:
said feature amounts contain audio information which is read from said moving picture signal.

8. A picture reproducing apparatus as claimed in claim 2, wherein:
said feature amounts contain motion compensating information of said moving picture signal.

9. A picture reproducing apparatus as claimed in claim 1, further comprising:
  a changing point level setting module which sets one of said plurality of judging levels;
  wherein said scene changing point judging module judges the scene changing point based upon one of said plurality of judging levels set by said changing point level setting module.

10. A picture reproducing apparatus as claimed in claim 1, wherein:
  said scene changing point judging means contains a plurality of judging references which are used to judge the scene judging point; and
  said reproduction control module controls stopping reproduction of the picture content at the scene changing point based upon a judging reference selected by a user.

11. A picture reproducing apparatus as claimed in claim 1, wherein:
  said scene changing point judging module judges the scene changing point based upon additional information attached to the picture content.

12. A picture reproducing apparatus as claimed in claim 1, further comprising:
  a scene changing point recording module which records thereon information related to the scene changing point judged by said scene changing point judging module;
  wherein said scene changing point judging module previously judges the scene changing point of the picture content before said picture content is reproduced, and records the judged scene changing point on said scene changing point recording module.

13. A picture reproducing apparatus as claimed in claim 1, wherein
  said reproduction control module controls to display information relating to a time duration until the reproduction is reached to the scene changing point upon receipt of an instruction for stopping reproduction of the picture content at the scene changing point which said scene changing point judging module has judged based on the one of said plurality of judging levels.

14. A picture reproducing apparatus as claimed in claim 1, wherein:
  said reproduction control module controls so as to restart the reproduction of the picture content at a scene point at which reproduction of the picture content has been stopped upon receipt of an instruction for reproducing the picture content after the reproduction of the picture content has been stopped.

15. A picture reproducing apparatus as claimed in claim 1, wherein:
  said scene changing point judging module calculates feature amounts contained in a moving picture signal of each of frames of the picture content under reproduction, and judges the scene changing point based upon a comparison result of the calculated feature amounts of said respective frames of the picture content.

16. A picture reproducing apparatus for reproducing a picture content, comprising:
  a content acquiring unit to receive a picture content from a content provider;
  a scene changing position judging unit to determine scene changing positions of scenes in the picture content based on a plurality of judging levels defined by the threshold levels;
  a reproduction control unit arranged to control a reproduction operation of the picture content, and to enable a user, during reproduction of the picture content, to temporarily stop the reproduction operation of the picture content at a particular position of a scene, restart the reproduction operation of the picture content from a temporarily stop position of the scene, and/or change the temporarily stopped position of the scene in the picture content,
  wherein, in response to receipt of a unit instruction from said user for changing one of said plurality of judging levels to another judging level, said reproduction control unit shifts a temporal stopping position of the picture content from a current candidate stopping position to another candidate stopping position where feature amount satisfies said another judging level during a time of until when the reproduction of the picture content is stopped from when having received an instruction for stopping the reproduction of the picture content at a scene changing point which said scene changing position judging unit has judged based on the one of said plurality of judging levels, and wherein said reproduction control unit controls stopping reproduction of the picture content at a scene changing point which is judged based on said another judging level after changing from said one of said plurality of judging levels to said another judging level.

17. A picture reproducing apparatus as claimed in claim 16, wherein said scene changing position judging unit calculates feature amounts contained in a picture signal of each frame of the picture content under reproduction, and determines the scene changing positions based upon a comparison result of calculated feature amounts of respective frames of the picture content.

18. A picture reproducing apparatus as claimed in claim 17, wherein the feature amounts include one of a color histogram of the picture signal, audio information which is read from the picture signal, and motion compensating information of the picture signal.

19. A picture reproducing apparatus as claimed in claim 16, further comprising:
  a scene changing position recording unit to record thereon information related to the scene changing positions;
  wherein said scene changing position judging unit determines the scene changing positions of the scenes in the picture content before the picture content is reproduced, and records the scene changing positions, via the scene changing position recording unit.

20. A picture reproducing apparatus for reproducing a picture content, comprising:
  a scene changing point judging module which judges a changing point of a scene of the picture content based on a plurality of judging levels defined by threshold values; and
  a reproduction control module which controls reproduction of the picture content and stopping reproduction of the picture content;

wherein:

in response to receipt of an instruction for temporarily stopping reproduction of the picture content, changing one of said plurality of judging levels to another judging level, said reproduction control module shifts a temporal stopping position of the picture content from a current candidate stopping position to another candidate stopping position where feature amount satisfies said another judging level during a time of until when the reproduction of the picture content is stopped from when having received an instruction for stopping the reproduction of the picture content at a scene changing point which said scene changing point judging module has judged based on the one of said plurality of judging levels, and wherein said reproduction control module controls stopping reproduction of the picture content at a scene changing point which is judged based on said another judging level after changing from said one of said plurality of judging levels to said another judging level.

* * * * *